(12) United States Patent
Cohen

(10) Patent No.: US 8,527,406 B2
(45) Date of Patent: *Sep. 3, 2013

(54) SYSTEMS FOR FINANCIAL AND ELECTRONIC COMMERCE

(76) Inventor: Morris E. Cohen, Brooklyn, NY (US)

( * ) Notice: Subject to any disclaimer, the term of this patent is extended or adjusted under 35 U.S.C. 154(b) by 480 days.

This patent is subject to a terminal disclaimer.

(21) Appl. No.: 12/817,139

(22) Filed: Jun. 16, 2010

(65) Prior Publication Data

US 2010/0280948 A1 Nov. 4, 2010

Related U.S. Application Data

(63) Continuation of application No. 09/955,464, filed on Sep. 18, 2001, now Pat. No. 7,747,523, which is a continuation of application No. PCT/US00/07457, filed on Mar. 20, 2000, now abandoned, which is a continuation-in-part of application No. 09/280,483, filed on Mar. 30, 1999, now Pat. No. 6,422,462, said application No. PCT/US00/07457 is a continuation-in-part of application No. 09/369,902, filed on Aug. 6, 1999, now abandoned.

(60) Provisional application No. 60/165,231, filed on Nov. 11, 1999, provisional application No. 60/161,283, filed on Oct. 25, 1999, provisional application No. 60/139,167, filed on Jun. 15, 1999, provisional application No. 60/138,428, filed on Jun. 10, 1999, provisional application No. 60/130,599, filed on Apr. 22, 1999, provisional application No. 60/130,600, filed on Apr. 22, 1999, provisional application No. 60/125,008, filed on Mar. 18, 1999, provisional application No. 60/095,770, filed on Aug. 7, 1998, provisional application No. 60/079,884, filed on Mar. 30, 1998.

(51) Int. Cl.
*G06Q 40/00* (2012.01)

(52) U.S. Cl.
USPC .......................................... 705/39

(58) Field of Classification Search
None
See application file for complete search history.

(56) References Cited

U.S. PATENT DOCUMENTS

| 5,220,501 | A | * | 6/1993 | Lawlor et al. | 705/40 |
| 5,884,288 | A | * | 3/1999 | Chang et al. | 705/40 |
| 5,903,881 | A | * | 5/1999 | Schrader et al. | 705/42 |
| 5,991,749 | A | * | 11/1999 | Morrill, Jr. | 705/44 |
| 2001/0037295 | A1 | * | 11/2001 | Olsen | 705/40 |

OTHER PUBLICATIONS

Sachdev, A. et al., "Web site's so electric, you can pay your power bill series: Talk of the bay", St. Petersburg Times, Fla.: Aug. 18, 1997.*

* cited by examiner

*Primary Examiner* — Olabode Akintola

(57) ABSTRACT

A system for electronic commerce including electronic banking tools, products and services. The system includes customizable banking products and cards, and methods and systems for conducting financial transactions and maintaining records over the Internet.

2 Claims, 6 Drawing Sheets

Server for storing and transmitting data

↓

Creation of a webbank by a user on server
(preferably via the Internet using a browser),
the server preferably being a central site
for all webbanks and being managed by
a central authority (such as a chartered bank),
with all transfers of information to or from
the server preferably being encrypted

↓

Transmissions of information to and from the user's webbank,
the transmissions being conducted by the user, by third parties,
and/or by the central authority, such as: transmissions
transferring funds between the webbank and any other financial
source (e.g. another webbank, a traditional bank or other
financial institution, a credit card, wire transfer or cash payment
to the central authority, etc.) and transmissions regulating,
managing or programming the accounts, subaccounts,
funds or other assets, and so forth, on the webbank

Figure 7

Server for storing and transmitting data

↓

Creation of a webbank by a user on server
(preferably via the Internet using a browser),
the server preferably being a central site
for all webbanks and being managed by
a central authority (such as a chartered bank),
with all transfers of information to or from
the server preferably being encrypted

↓

Transmissions of information to and from the user's webbank,
the transmissions being conducted by the user, by third parties,
and/or by the central authority, such as: transmissions
transferring funds between the webbank and any other financial
source (e.g. another webbank, a traditional bank or other
financial institution, a credit card, wire transfer or cash payment
to the central authority, etc.) and transmissions regulating,
managing or programming the accounts, subaccounts,
funds or other assets, and so forth, on the webbank

Figure 8

Accessing of a webbank or a disk or card
↓

Transactions involving webbanks and disks or cards, including:

transactions involving standard recordable or read/writable
optical disks, and/or magnetic stripe cards
and/or hybrid magnetic stripe and optical disk cards; and/or transmissions transferring funds between a webbank
(or any other financial source) to or from disk or card (or hybrid); and/or transmissions modifying the parameters of an
account (including a webbank or webbank account,
or a customizable credit card or debit card account) using a card; and/or transmissions creating electronic cash cards or
modifying electronic cash on a card using an optical disk drive
(e.g. for recording or writing on an optical disk which serves as the card)

Figure 9

ATM Wire Transfers and Programmable Card Transfers

User accesses financial institution and user's account
(e.g. metabank and/or webbank over the Internet)

↓

User links account or portion thereof to
number on debit, ATM or credit card,
including programmable credit or debit card

↓

Recipient uses card to withdraw
funds from an ATM machine, or to engage in
traditional or online transactions

Figure 10

A website is provided to a user for billing
functions to third parties (preferably a webbank)

User provides the website with billing information
by inputting information manually or by
transmitting information to the website from a
computer program (e.g. an accounting or
billing program), or by any other desired method

Website electronically formats invoice

Website transfers electronic invoice to a third party

SYSTEMS FOR FINANCIAL AND ELECTRONIC COMMERCE

RELATED APPLICATIONS

The present application is a continuation of U.S. Nonprovisional application Ser. No. 09/955,464 filed Sep. 18, 2001, now U.S. Pat. No. 7,747,523, which is a continuation under 35 U.S.C. §120 of PCT Application Serial No. PCT/US00/07457 filed Mar. 20, 2000 (now abandoned).

PCT Application Serial No. PCT/US00/07457 is: (a) a continuation-in part of U.S. Nonprovisional patent application Ser. No. 09/280,483 filed Mar. 30, 1999 (patented, now U.S. Pat. No. 6,422,462 B1), which claims the benefit of U.S. Provisional Patent Application Ser. No. 60/079,884, filed Mar. 30, 1998.

PCT Application Serial No. PCT/US00/07457 is also: (b) a continuation-in-part of U.S. Nonprovisional application Ser. No. 09/369,902 filed Aug. 6, 1999 (abandoned), which claims the benefit of U.S. Provisional Patent Application Ser. No. 60/095,770, filed Aug. 7, 1998.

PCT Application Serial No. PCT/US00/07457 also: (c) claims the benefit of U.S. Provisional Patent Application No. 60/125,008, filed Mar. 18, 1999, U.S. Provisional Application No. 60/130,600, filed Apr. 22, 1999, U.S. Provisional Application No. 60/130,599 filed Apr. 22, 1999, U.S. Provisional Application Ser. No. 60/138,428 filed Jun. 10, 1999, U.S. Provisional Application Ser. No. 60/139,167 filed Jun. 15, 1999, and U.S. Provisional Application Ser. No. 60/161,283 filed Oct. 25, 1999, and U.S. Provisional Application Ser. No. 60/165,231 filed Nov. 11, 1999.

All rights of priority to each of those applications is claimed to the fullest extent available, and the entire contents of all of those applications are fully incorporated herein by reference.

BACKGROUND OF THE INVENTION

Currently, most commerce is conducted using traditional methods well known for many decades. Over sixty billion paper checks are written each year, the majority by businesses. Recently, however, electronic commerce has rapidly been emerging as a new and important force in global transactions. Online transactions over the past several years have achieved healthy levels and show no signs of letting up. Yet, while various systems for electronic transactions have been proposed or implemented (including credit card payment systems over the Internet and so forth), numerous disadvantages and shortcomings exist in the systems present in the art. Accordingly, it is an object of the present invention to provide a new system for conducting electronic commerce and for improving the efficiency of financial and other interactions.

SUMMARY OF THE INVENTION

The present invention relates to a new system for banking and electronic commerce and e-finance products and services.

This system includes the first Internet Metabank™—a new type of Internet bank with an advanced series of capabilities beyond those of the traditional banks or Internet banks currently in operation. The Metabank™ provides consumers with the ability to instantly open corporate and personal webbanks, new forms of financial vehicles specifically created for the Internet.

Each Webbank™ consists of a private miniature Internet bank which is located on the World Wide Web, and which is under the control of anyone from a multinational corporation to a private individual. As such, the Webbank™ allows any party (the bank "owner") to directly serve as an Internet banker and as a Metabank™ banking "subsidiary". It thereby forms a powerful financial tool functioning as a private sub-bank in cyberspace of a true bank (and having many of the powers of traditional and Internet banks), while yet continually remaining under corporate or personal control. Thus, corporations and individuals are able to own their own private "bank" which is available to them twenty four hours a day, seven days a week, with all of the advantages and benefits that owning a bank entails.

As just one example of these advantages and benefits, the system provides its owners with direct access to a web-based wire transfer system for instantaneous transfer of funds to any third party. As this transfer is conducted over the Internet, consumers can wire transfer funds without the need to physically go to or through a traditional bank. Even more importantly, funds transfers can be conducted instantaneously in a cash-like fashion across the globe, without any need for the recipient to wait the usual 1-3 days necessary for "rapid" funds to be received (as with traditional bank wire transfers), or to wait over a week or more for "normal" payments to be received and cleared (as with traditional checks).

As a group, the webbanks constitute their own subset of the Internet which can be referred to as the Milliiiweb™, "Metaweb"™ or so forth. Any Webbank™ can engage in direct electronic transactions with any other webbank in the Milliiiweb™ or with traditional banking networks. Such electronic transactions can be the wire transfers described previously or more sophisticated transactions. All electronic transactions are subject to predetermined parameters established by the metabank which serves as the overseer bank or "parent" of the banking system.

Each Webbank™ further provides its owner with powerful new Internet-based e-finance products and services. For example, they provide webbank owners with the ability to quickly create Programmable Credit Cards™ using a personal computer. These cards are novel credit cards whose functions are programmed by the bank owner over the Web, allowing new levels and types of credit card uses, flexibility and control. Among their uses, these cards can serve as corporate expense cards, providing corporations with instantaneous control over and regulation of corporate spending. Likewise, the Webbank™ provides bank owners with the ability to create their own "currency cards", i.e. spending vehicles which can be used as substitutes for cash, checks and traditional debit cards. Yet, unlike smart card systems, the present system allows these functions to be achieved by consumers using their existing equipment.

At the same time, each webbank also provides its owner with the ability to simply and quickly establish a central site in cyberspace where all bills to that owner can be electronically forwarded and archived, and from which all bills can be paid. Furthermore, the business or webbank owner can use that same site to generate electronic invoices, changing the nature of current billing and payment systems. The webbank also provides its owner with the ability to maintain electronic safety deposit boxes, i.e. secure electronic sites where records are authenticated, time and date stamped, and stored by the metabank.

BRIEF DESCRIPTION OF THE FIGURES

FIG. 7 is a flowchart briefly summarizing use of a website as a webbank in accordance with some embodiments of the present invention.

FIG. 8 is a flowchart summarizing use of a website as a webbank in conjunction with financial cards in accordance with further embodiments of the present invention.

FIG. 9 is a flowchart summarizing the use of a website as a webbank to wire transfer funds to an ATM machine or a programmable financial card, in accordance with further embodiments of the present invention.

FIG. 10 is a flowchart summarizing the use of a website for electronic invoicing, in accordance with further embodiments of the present invention.

DETAILED DESCRIPTION OF THE INVENTION AND THE PREFERRED EMBODIMENTS

Figure 1:
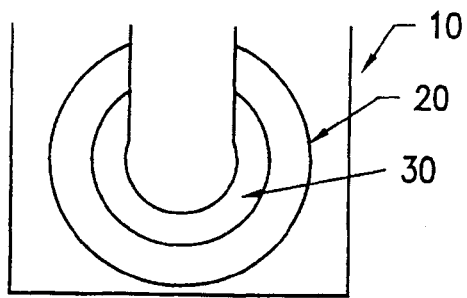
FIG. 1 is a top view of a computer optical disk carrier for holding compact disks (CDs), as known in the prior art.

I. Overview of the Electronic Commerce System

In accordance with the invention, sophisticated tools are placed in the hands of the ordinary consumer, creating new levels of financial flexibility, efficiency, and control, all easily accessible from any computer.

The invention relates to a new type of financial entity referred to herein as a Metabank™—a new type of "Internet//tional™" bank which serves as the overseer bank for a series of "webbanks" opened and "owned" by individual consumers and corporations. These Internet webbanks are private "sub-banks" under the day-to-day nominal control of any individual or corporation, providing consumers with new e-tools and e-services of considerable power. At the same time, the overseer bank, or metabank, is an Internet bank serving as a member of traditional banking networks. Accordingly, the metabank provides consumers and businesses with a bridge closing the gap between the potentials of the Internet, e-commerce, and the infrastructure of the established, traditional banking system.

In the preferred embodiment, on a first basic level, the metabank is intended to serve as a chartered bank, retaining the rights and abilities to engage in all of the traditional banking functions and activities that are available to other traditional banks. On a second level, the metabank serves as an Internet bank, providing consumers with accessibility over the Internet and achieving the economies associated with a branchless, low overhead Internet banking model. On a third level, the metabank serves as a new Internet technology provider, offering new forms of computer-implemented financial e-tools and e-services. Lastly, on a fourth level, the metabank serves as an financial gateway, providing a central site where consumers can easily participate in large numbers of commercial and financial interactions with other members of the metabank and with outside parties. At this gateway, webbank owners can generate and receive electronic bills, engage in Internet based electronic payments, conduct electronic trading and loan, and conduct numerous forms of financial transactions previously not feasible or practical. In this manner, the metabank serves as a central intermediary for parties wishing to engage in a wide variety of commercial and electronic transactions.

The metabank, therefore, creates sophisticated new electronic commerce products and services, and in so doing, creates markets for new forms of electronic commerce, including a new market for the webbank and a new market for programmable credit and debit cards which can be freely given out to children, employees, friends, family, and so forth. Thus, the metabank's technologies can encourage and facilitate the transfer of large numbers of traditional transactions into an electronic framework. Previously, many of these transactions could not (or would not) be conducted electronically. The metabank's inventions and technologies are also intended to organize all of a company (or individual's) payments, invoicing, and recordkeeping in a single central location on the World Wide Web.

Furthermore, the invention provides a system having a series of novel e-financial tools and services designed to accomplish new financial functions that cooperate with each other to synergistically achieve their full potential.

A. The Metabank™

As described above, the invention provides the first Internet "metabank"—an overseer bank providing consumers with the ability to engage in true, realtime, transactions worldwide, and to engage in new types of sophisticated financial transactions. The Metabank™ operates as the parent of a new network of Webbanks™ which are created over the World Wide Web, and which constitute a cyberspace subset of the Internet referred to by the metabank as the Milliiiweb™, the Metaweb™, or so forth.

Previously, traditional banks and Internet banks in the marketplace have been merely "Internet-accessible" in that they follow essentially traditional banking designs but are accessible over the Internet. In contrast, the Metabank™ is "Internet-structured" or "Internet//tional™"—or, in other words, is designed in its basic structure like the Internet and other large scale computer networks. This Internet//tional™ design is one of the fundamental advantages of the Metabank™ over existing banks and ecommerce solutions, providing the Metabank™ with the ability to commercialize powerful e-tools and e-services which have heretofore been untapped.

In its capacity as a Metabank™, the metabank acts as a financial gateway for extensive amounts of old and new types of commercial transactions. This metabank delegates certain simple "banking" rights and capabilities to each of its member webbanks. Each of those member webbanks can further customize and program accesses and functions of webbank subsidiaries. Accordingly, member webbanks serve as a "private banking network" over the World Wide Web, facilitated by the metabank which serves as a central financial intermediary.

B. The Webbank™

The Webbank™ (also referred to as a Milliiibank™[1] mini-bank, or so forth) is a new financial vehicle consisting of a miniature Internet bank, i.e. a personal or corporate Internet bank which anyone can open on the World Wide Web. By accessing the metabank over the Internet, anyone can "own their own bank", i.e. quickly create and open a private bank in cyberspace.

[1] Pronounced "mill-ee-bank" or "mill-ih-bank"

Once a party opens a Webbank™, he or she is the bank's "owner", having nominal day to day control over all bank operations. Anyone who owns an Internet bank can then, in turn, serve as a banker for old and new types of electronic and traditional commercial transactions.

Bank owners can provide third parties with the ability to withdraw funds, deposit funds, send or receive information or bills, and so forth, at the banker's Webbank™. Bankers can likewise make their banks accessible to any third party, or alternatively, only to authorized parties, at all or predesignated times of day and night. The Webbank™ can thereby serve as a central nexus for all commerce and banking conducted by a company or individual, in many ways replacing the use of traditional banks, and even recent Internet banking establishments. Using the metabank's systems, anyone from a small child to a multinational corporation can own a personal or corporate Internet banks in cyberspace and serve as the initiator, recipient, or intermediary for a wide variety of electronic transactions.

The Webbank™ further serves as the party's financial control panel with a series of e-tools for customizing and controlling the bank owner's financial products and services. Specifically, as this control panel, the Webbank™ allows the bank owner to customize and create new financial vehicles, including, for example, personal currency and credit cards, and to engage in new forms of financial transactions. Third parties can likewise be given or issued such vehicles, as desired by the bank owner.

One important example of such a new form of financial transaction is the ATM wire transfers, a function currently unavailable in the traditional banking system. This function is a type of wire transfer in which a webbank owner can wire money to any ATM machine. Thus, a webbank owner can wire funds to any individual or third party which that individual can quickly pickup at an ATM.

The Webbank™ further serves as a member of the Milliiiweb™, a virtual network of private cyberspace banks operating on the World Wide Web. As part of the Milliiiweb™, bank owners can create and engage in financial collaborations of significant flexibility, and can create miniature private banking networks and directories.

Moreover, due to the fact that it is part of the Metabank™, the Webbank™ can also interact with traditional banking networks, providing users with "the best of both worlds", including the ability to use ATM machines, traditional banks, and the other banking products and services associated with traditional banks.

The webbank further allows anyone who has a website to directly associate a bank therewith, and thereby immediately engage in e-commerce, sending and receiving payments for online transactions.

Likewise, the webbank system also provides users with the ability to transfer money from party to party instantaneously, at speeds even faster than traditional bank wire transfers (which typically take 1-3 days to clear due to the structure of existing banking systems). The webbank system allows any user to easily send these electronic transfers of funds to any recipient (to pay friends, pay bills, or so forth) even if that recipient is relatively unsophisticated, is unfamiliar with electronic commerce, or does not own its own webbank. That recipient can electronically receive the funds instantaneously, even if the recipient is a very small entity (such as an individual) as opposed to current systems wherein only large entities are typically able to receive electronic transfers from bill payment systems (even then receiving such electronic transfers in 1-3 days). Moreover, under the webbank system, any party (e.g. merchant, individual, or organization), can immediately receive payments at a website without needing to pay high fees associated with the processing of the credit card transaction, and without needing to set up a credit card merchant account.

The webbank system thus dramatically changes current financial methods by providing consumers with instantaneous control over the flow of their funds and money. In current systems used by Internet-accessible banks, consumers authorize payments and those payments are subsequently sent out at some point in time by the bank to specific vendors. Such prior systems are based on an authorization to pay by the consumer, with actual payment sent out later by the bank. After the consumer logs off of the system, a payment is sent out later that day or the next day or several days later (e.g. when the consumer accesses the system on the weekend). Payments can take days or more than a week to be received and then cleared.

In contrast, the webbank system is not based upon a mere authorization to pay, but on the ability to control all aspects of a payment including, for example, the time of receipt and the time of clearance (which can be the same as or different from the time of receipt, as desired by the bank owner). In those cases when an immediate receipt of payment is necessary, the consumer has the power to effect such an instantaneous transfer, something not possible with current systems.

From the consumer's perspective, the system provides an important tool missing from current banks. The present computer age has repeatedly demonstrated the power, need and value of instantaneous interaction. Tools providing such power have shown enormous market penetration and popularity. A common example of this is e-mail which has provided the ability to communicate in writing instantaneously, making it an indispensible tool of communication and commerce. The advantages of the metabank are based upon systems which can provide the same advantage of instantaneous control in the financial sector that systems as electronic mail have provided in the area of communications. As an analogy, traditional banks are to the webbank system as the postal system is to modern e-mail.

From the metabank's perspective, the metabank gains a significant competitive advantage over other banks by becoming the central processor of large numbers of electronic transactions. For the most part, a paperless system is utilized, reducing operating costs and increasing the metabank's profitability. E-commerce transactions over the Internet are facilitated through both credit cards and simple banking alternatives to credit cards. These banking alternatives place the metabank in the center as the direct and single intermediary between a buyer and a seller, allowing the metabank to charge transaction fees lower than credit card companies, making it a preferable and more cost-effective alternative for merchants.

C. The Programmable Credit Card™

The Programmable Credit Card™ is a specialized form of credit card designed to take advantage of the power provided by the Internet and the Metabank™. These credit cards are credit cards which have been segmented into a series of functions or parameters for all of the credit card's traditional functions. Each of these parameters can be directly viewed and programmed over the Web by the bank owner (and any designated third party) using the Webbank's™ control panel. As a result, consumers are provided with a new level of control over exactly what a credit is and what it can achieve, including how credit cards will be used in the future and who uses them.

For example, the Programmable Credit Card™ makes it possible for a corporation to issue credit cards to each and every one of its employees for centralized expense tracking, regardless of that employee's level in the corporation (from the most junior to the most senior). This ability is provided while reducing or eliminating the risk of misuse or loss.

Previously, such concerns have minimized the degree to which credit cards could be distributed to corporate employees.

Likewise, the card makes it possible for parents to give a "children's credit card" to a child of any age, also without the risk of misuse, theft, or fraud. Such cards permit children to take part in credit card transactions, whereas they were previously a population barred from participating in such activities.

The card also provides any individual with the ability to extend "credit" to other parties, including parties which would ordinarily not be able to qualify for credit.

Furthermore, the technology allows the first freely transferrable credit card, i.e. a credit card which can be given out and distributed like cash. This allows credit cards to be given out as gifts, serving as a "gift credit card". Consumers are thereby given the opportunity to hand out an open-ended gift that provides the recipient with the complete flexibility to buy what they want. The consumer giving the gift does not pay for that gift immediately (as opposed to the disadvantage of a check or a gift certificate) but rather pays for that open-ended gift over time, as with any other credit card transaction. The recipient, on the other hand receives the gift immediately (or whenever he or she chooses to use it). This is a significant advantage over a physical gift (even a physical gift paid for with a credit card), since that physical gift might not be what the recipient needs or wants. It is also an advantage over even a gift certificate, since that gift certificate must be paid for up front, before the recipient uses it.

The programmable credit card technology also allows credit cards to be physically handed out for any desired payment purpose. In addition, it provides consumers with the ability to apply for and receive their credit cards instantaneously (within the hour or less), rather than waiting several weeks or longer to receive a credit card in the mail as is currently the standard practice. Furthermore, the technologies allow consumers to use their credit cards more frequently, more extensively, and in ways not possible with other credit cards.

D. The Currency Card™ or Programmable Debit Card™

The personal and corporate currency cards™ (also known as programmable debit cards™) are financial tools which, like traditional debit cards, draw on preexisting funds rather than a line of credit. However, unlike traditional debit cards, the Currency Cards™ are provided with a wide range of programmable functions, providing consumers with significant degrees of flexibility and control. This flexibility is similar to that provided with the programmable credit card described above. Also like the programmable credit card, these functions are programmed using the consumer's Webbank™.

As a result, the programmable debit card serves as a spending tool of unusual power, with the potential to serve as a simple cash substitute and/or as a substitute for conventional checks. But, unlike cash and checks, the programmable debit card can be instantly tracked and modified using any computer. Accordingly, the programmable debit card allows a consumer to create a simple cash card for a single day or transaction or for any other period of time or customized purpose desired. This customized card can only be used by the webbank owner or an authorized party (and, if desired, only for specific customized uses), thereby minimizing the risk of loss of funds if the card is misplaced or stolen. Using the bank owner's Webbank™, the bank owner's "funds" can be instantly tracked, recovered, modified, or cancelled at any time. The technology, therefore, allows debit cards to be freely customized in any desired fashion and then handed out to any third party, providing consumers with the ability to issue their own "currency".

E. The Miracard™

The miracard is one of the embodiments of several physical products which can be used as the physical implementation of many of the programmable credit and debit cards discussed above. Intended for use in conjunction with the programmable credit card, the programmable debit card and with the webbank, the miracard provides consumers with the ability to easily and quickly create and issue credit and debit cards, both to themselves and to others, in the privacy of their own home or office using a personal computer. These credit cards and debit cards can be issued, customized, revoked, or otherwise modified as desired. In future embodiments, the miracard may further become useful as a transaction card for coordinating centralized receipt collection of purchases of any kind, including many cash and check purchases.

F. The Webbank Billing, Receipt and Invoicing Center™

The webbank billing center is a designated Internet nexus for managing all billing matters conducted by a business or consumer. It allows the centralization of billing and payment functions, simplifying and speeding monthly payments. It also allows the centralization of recordkeeping functions such as the collection of bills and receipts.

This nexus serves as a subset or function of the user's webbank. It provides one central site where all past and current bills can be reviewed over the Internet, where all account history can be reviewed, where the status of payments can be checked, where payments can be made, and so forth, all from the user's personal computer.

Thus, a business or a consumer can provide the webaddress of its billing center to vendors who can then forward all bills or invoices to the website corresponding thereto. At that website, the billing center thus collects all of the business (or consumer's) bills in one place. When the business or consumer wishes to pay outstanding invoices, it can access all of its invoices or bills at the webbank. It can also easily retrieve past bills and invoices without having to search for paper copies of those bills.

Likewise, the business can generate electronic invoices by using the tools provided at the webbank. Individuals can just as easily generate these invoices as well. These electronic invoices can be sent to any buyer, particularly buyers having a webbank, for collection at that buyer's webbank and integration with a database associated therewith.

Similarly, a business or consumer acting as a vendor of some goods or services can generate a receipt for any transaction to a buyer. Using the webaddress of the billing center, the receipt can be forwarded to the buyer's webbank for storage thereon, so that all receipts are collected and stored together at the webbank for accounting purposes.

Consequently, using the webbank system, electronic payments, invoices and/or receipts, can all be quickly generated and instantaneously transferred between parties.

As an illustration of current systems vs. the present system, the following sequences of events are typical in business to business transactions, or transactions with individuals.

In a standard version of current systems, a vendor generates a paper invoice for goods and services provided to a consumer. The invoice is printed out and mailed to the consumer, whether the consumer is an individual or a second business. The consumer, if it is a business, inputs the appropriate details into its accounting system (if it has one). Whether the consumer is a business or an individual, the consumer typically writes out a check to the vendor. Even if mailed immediately, the vendor receives that check several days later in the mail, then deposits the check after some time has passed, and then waits an additional several days thereafter for the check to clear. From generation of the invoice to clearance of payment, at least one to two weeks can elapse.

In a "fast version" of current systems, the vendor can fax the paper invoice to the consumer. If extremely rapid payment is needed, a wire transfer can be arranged, which can often take over a day to be processed by the bank and cleared into the recipient's account. Thus from generation of the invoice to receipt of payment at least one to two days can elapse.

In the present system, an electronic invoice can be rapidly generated by a vendor using the webbank or by using some other program or predesired format. That invoice can be quickly sent over the web to the consumer's webbank, where the invoice is received instantaneously. Due to the fact that the invoice is electronic, no inputting needs to be done into the consumer's accounting system. The consumer can then use its webbank to forward back an electronic payment to the vendor's webbank, with the payment clearing instantaneously into that webbank. Thus, all steps in the invoicing process can be conducted in a matter of minutes. Likewise, all steps from the consumer's payment to clearance of payment can likewise be conducted in a matter of minutes using the webbank system once the consumer is ready to pay. Once payment is received, an electronic receipt can be forwarded back as well. If the vendor and consumer both wish, the entire cycle from invoicing to clearance of payment can be nearly instantaneous.

G. The Electronic Safety Deposit Box

The electronic safety deposit box is an online electronic lockbox associated with the webbank for storage, access, and recordkeeping of a user's important documents and assets. Accordingly, the user can easily and quickly access and present verified, digital copies of important documents and records from a central location, for self-access or presentation to third parties. Such documents can take advantage of date stamping, authentication, and other services provided by the metabank for providing security and trusted storage in online and traditional commercial transactions.

II. General Webbank Operation

A. Creation of Webbank

In accordance with the inventions disclosed herein, any entity with access to the Internet can open up its own private miniature bank located on the Internet, such private "webbank" being referred to herein as a webbank, Webbank™, minibank or so forth. In the preferred embodiment, the entity opens up its webbank by logging into the overseer bank's website (also referred to herein as the Metabank™ website) over a secure connection, so that the entity can open up its own website at the bank. Such website acts as the entity's webbank. The operation and creation of websites is well known in the art and all such hardware and software as are used for the operation and creation of such websites can be utilized in accordance with the present invention. The entity opening the webbank, is referred to herein as the "webbank owner".

In a preferred embodiment, the entity logs into the metabank's website, and fills out a form thereon over a secure connection. Once the form has been filled out, a website is created on the web, which is stored on the Company's server, in the same manner as is known in the art, and the webaddress for this website is provided to the webbank owner. This webaddress can (as with the other webaddresses disclosed herein) be any suitably long and random series of digits and/or letters desired. In accordance with the invention, the website serves as the control panel for the entity's personal or corporate webbank. This webbank, which will appear like a website, serves as a gateway to engage in sophisticated and instantaneous financial transactions.

A variety of levels of verification can be provided of the information provided on the form by the new webbank owner. In one embodiment, the identity of the party opening the webbank is not verified or required by the overseer bank. In an alternate embodiment, some identity information is performed, such as driver's license data, social security number data, physical home and/or work address, home and/or work phone numbers, and so forth, as is currently well known. This identity information can be verified to the extent desired. In a further embodiment, digital signatures and digital certificates can be used for further verification purposes, if desired.

B. Maintenance of Funds and Records on Webbanks

In a preferred embodiment of the invention, these webbanks serve as central personal or corporate financial websites which are used to hold, manipulate and control the webbank owner's funds (or some fraction or parameters thereof), and which provide novel financial tools for control of those funds. In the preferred embodiment of the invention, funds are directly associated with those webbanks in cyberspace, in the same manner that a dollar bill (or other coins or currency) is directly associated with certain units of monetary value.

These webbanks can therefore be used to maintain, hold, transfer, and keep records of the individual or entity's funds and assets, with the funds and assets being under the direct, continual, and preferably instantaneous control of the individual or entity. While they serve as an almost physical, locatable function, like physical forms of currency, the webbank is also directly addressable or locatable over the Internet, can be moved through cyberspace, and otherwise manipulated over computer networks. Accordingly, these webbanks are used to "hold" money and/or assets and fix them in an addressable location, which the individual or others can access, transfer, invest, or so forth, at will. Although these webbanks are preferably websites on the Internet, in other embodiments, the sites can be private and/or public sites on a global information network.

C. Use of Private and Public Webaddresses

Preferably, the webaddress provided to the webbank owner is the main, private, access point for the webbank. Thus, the webaddress provided to the webbank owner is preferably a private one, which is known only to the webbank owner for security purposes. In other embodiments of the invention, public webaddresses can be provided to other parties for other purposes.

In addition to the secrecy of the webaddress of the main account, various other security procedures can be provided, as known in the art, for secure access to the webbank by only authorized parties. These include, but are not limited to, for example, the requirement of an ID and/or password upon accessing the site, use of a password which is then encrypted using the owner's private key and then sent to the bank, verification of the microprocessor serial number (e.g. using such chips as the Pentium III) of the accessing computer, biometric identification means of the accessing party, and so forth. Likewise, if desired, in accordance with the invention, records can be kept on the user's personal computer which can be compared to records at the webbank, if desired, to verify that the personal computer being used is the owner's own computer, e.g. for some or all types of transactions. These records can be selected or random account records, or records of access times and transactions engaged in by the webbank owner, or so forth.

D. Transfer of Existing Money to a Webbank

Once the webbank is opened, the owner can initially transfer money to that webbank from any other webbank, or using any of the means for transferring funds well known in the art. Thus, the webbank owner can send the overseer bank a check, can wire transfer funds to the overseer bank, can charge money to his or her credit card for deposit at the webbank, can transfer money off of a debit card or a smart card, or can use any other means previously known in the art, currently proposed in the art, or used in the future.

In addition, if desired, the webbank owner can transfer money or have money transferred, to his webbank from any other webbank, whether his or her own webbank, or that of a third party. Likewise, any other party can transfer funds to the owner's webbank, using any desired means. Preferably, all transactions and communications of any sort with a webbank are, of course, conducted using secure means, including the encryption technologies currently known in the art or later developed.

E. Linkage of Webbank to One or More Central Metabanks

In one embodiment, for example, all funds held in individual webbanks are deposited and held at a central authority which serves as the parent to any webbanks opened up on the Internet. The central authority can be a bank, a card issuing authority or so forth. In the preferred embodiment, the central authority is a bank which serves as an overseer bank (i.e. "metabank") to all transactions conducted. In various alternate embodiments, the central coordinating authority can be an authority created specifically for this type of financial network, or a bank, a credit card company, debit card company, brokerage house, insurance company, or so forth.

As described herein, all webbanks are, in a sense, a subsidiary of the metabank or any other related entities. When a webbank owner engages in any transaction using the webbank, the information regarding that transaction is preferably transmitted to the metabank's server or servers. In a preferred embodiment, instead of one central metabank server, a network of metabank servers can be provided which intercommunicate. Likewise, the webbanks themselves are preferably located on metabank's server(s), and/or the server(s) of its related entities or affiliates.

The metabank is therefore the overseeing authority for all transactions conducted on the webbank network. Individual webbank transactions are conducted under the auspices or supervision of the cenral authority, with the central authority serving as the overseer or intermediary for the transaction. Preferably, however, most or all of the specifics of the transaction are under the control of the webbank owner. In the preferred embodiment, information regarding the content and nature of such transactions is transferred to the overseer bank with each transaction, but most or all of the banking functions normally conducted by the bank are conducted by the webbank owner directly.

The network of webbanks, and the connections and linkages between webbanks, preferably uses existing software and/or hardware technology known in the art for secure connections with a website or a business or network. Such software and hardware have been used in numerous prior contexts, and include, but not limited to, technologies regarding encryption and authentication, and regarding intranets, extranets, and virtual private networks. In an alternate embodiment, any other technology for establishing such secure connections can be utilized.

For example, the technology for secure network configurations is known in the art. In a virtual private network design, for example, the VPN server can use whichever currently available protocols are desired to establish the network. At present, there is no uniform VPN protocol in use. Accordingly, any of the various protocols currently employed in the art could be used in conjunction with the invention. These include, for example, Microsoft's Point to Point Tunneling Protocol (PPTP), the SOCKS proxy, and the proposed IPsec suite of protocols. Alternatively, other protocols now under development by router and firewall vendors may prove useful as well. Whichever protocol is employed, the VPN will use a suitably high security method to ensure that sessions are only established by authorized entities, whether RADIUS, the Challenge Handshake Authentication Protocol (CHAP), or so forth. Alternate protocols for a webbank network, include, but are not limited to, the Security Sockets Layer (SSL) developed by Netscape Communications Corporation of Mountain View, Calif.; Secure HTTP (S-HTTP), developed by Enterprise Integration Technologies (http://www.eit.com); Microsoft's Private Communication Technology (PCT); the Secure Electronic Transactions specification (SET); or so forth. The SSL protocol is particularly attractive in many ways, due to its current widespread use, although the present invention is not limited to any single particular protocol.

Likewise, in the preferred embodiment, the metabank is a member of existing financial networks such as the networks used to process credit card transactions, wire transfers, ATM withdrawals and so forth. The metabank membership in existing networks with the concurrent use of bank accounts and money comprising webaddresses forms a powerful synergistic combination as disclosed herein. This combination provides the user with a bridge between the power of computer networks and the Internet and existing financial networks which can be utilized for a new level of flexibility and financial control. Thus, in addition to the use of website technology or association with the bank accounts and funds discussed herein, the metabank's role as a member of traditional banking networks allows the accounts and subaccounts discussed herein to be established using existing financial, banking and/or credit and debit card networks and to obtain the benefits of membership in such existing networks.

Moreover, in the preferred embodiment, the website is linked to financial data and information at the metabank using existing technologies. In one such embodiment, the webbanks is linked to financial databases at the overseer bank using XML and/or any other suitable programming language currently available (or later developed in the art) for sharing and/or transferring information, or linking information to databases, including information in a webpage. In this embodiment, the outer template of the webbank's webpage, presenting the format of the website, is preferably programmed using HTML or some other available or appropriate language, with the underlying financial data and information being linked to the webbank using a language such as XML.

The use of such known protocols (or any other desired protocol) allows segments of data from the metabank's database to be associated with individual websites or webbanks, which can then be individually customized to control the level of association of that segment of data with other databases, the degree to which that particular data is shared with third parties, the degree to which that data and the funds associated therewith are controlled and manipulated, and so forth.

Thus, in accordance with the invention, a consumer can maintain his or her own webbank on a server, preferably the server of a financial institution. This webbank is similar to a webpage of the prior art, but is further encoded with functionality to serve as a miniature private bank which is a sub-bank of the overseer bank, known as the metabank. This webbank serves as a personal or corporate bank for receiving, transferring (e.g. at preprogrammed times and under preprogrammed conditions), managing, and monitoring information, funds, and transactions of the bank owner. It can further act and interact with any other webbank to engage in financial transactions, pursuant to the conditions established by the webbank owner, and subject to the conditions set by the overseer bank.

III. Webbank Control

Thus, in accordance with the invention, a personal or private web bank is provided, which can be created at will instantaneously by any entity, such as for example, individuals or corporations. Such a webbank is created by creating a webpage which is preferably maintained on the server of a central overseeing authority, which is preferably a bank, the funds and data on the webpage being maintained under the overseer bank's control and authority. The conditions of the functions available on such webbank are preferably governed and controlled by the overseer bank, which provides the parameters under which such website banks are created and operated.

Once created, such webbank serves as a private virtual bank maintained by the user on the web, which can engage in financial transactions like a regular bank. The user acts as the owner of the webbank, which webbank is in turn owned by the overseer bank. The user as webbank owner, regulates and manages the day to day activities of the webbank, including "account creation," and so forth. The webbank owner can be any entity, whether an individual, corporation, or organization, and can be of any size, whether from one person to any number of individuals. The simplicity or complexity of the webbank is therefore customized to fit the needs of the user, whether as a single webbank with one webbank/subaccount associated therewith, or whether as a webbank with a network of millions or billions of associated webbanks, linked or deriving therefrom. Each webbank can serve as a financial control panel and as a clearinghouse for all transactions (whether conducted by the webbank owner or another party), which is associated with or related to that webbank.

Bank owner can access webbank over the Internet.

A. Webbank Subaccounts as Webbank Subsidiaries

The webbank owner is provided with the main access to the webbank, and the authority to control and modify the webbank as desired. Thus, for the purposes of comparison, the webbank owner serves as "system administrator," "webmaster," or "bank owner" for the webbank, with all of the privileges and powers associated therewith. Thus, the webbank owner controls, manages and regulates all functions associated with that webbank, subject only to the overriding control of the metabank, and the parameters established by the metabank. The webbank owner, therefore, has greatest access and control of the webbank, second only to the metabank.

A webbank will generally be provided with a main account accessible only to the metabank and to the webbank owner for security purposes. As previously discussed, the identity of that main account preferably remains a secret such that only the metabank and the webbank owner know the webaddress for that main account.

From the main account (that webbank owner's "main webbank" or "webbank headquarters"), the webbank owner can create subaccounts to the webbank. The webbank owner can likewise view or modify any of its subaccounts as well. The main account and subaccounts are preferably all webbanks as well, i.e. websites linked to the metabank. They, therefore, serve as subsidiary webbanks to the webbank owner's main webbank.

These subaccounts are linked to the main account but preferably have a different number so that they can be used for appropriate uses without giving third parties any access, under any circumstances, to the main account number. In accordance with this function, the user can automatically create or generate subaccounts off of his or her main account number whenever desired. In the preferred embodiment, the webbank owner merely accesses its main webbank and chooses a function to create a webbank subaccount or subsidiary. The webbank owner then inputs the relevant information about the subaccount to be created (e.g. the authorized users and any other parameters to be associated with the subaccount and/or any money therein), and a new webbank or website is created which is a subsidiary to the main webbank. As a subsidiary, the new webbank is linked to the main webbank and is under the main webbank's control (both, of course, being under the metabank's control).

In alternate embodiments, creation of subaccounts can be done either directly by the user (e.g. by adding an alphanumeric tag to the end of the main account number, or to the end of a main subaccount number, or by using an account generating function accessible from within the webbank, from within the Internet browser, or so forth which generates separate unrelated subaccount numbers), or by obtaining authorized account numbers from the overseer bank. In a further alternate embodiment, the metabank (which can also in general act as a card issuing authority) provides the user with a list or group of additional subaccount numbers reserved for the user or owner of that webbank's use whenever desired. In another embodiment, the user or owner of the webbank is provided with a certain number of subaccounts, which he or she can modify, use, distribute as desired, and then later is provided with additional subaccounts or groups of subaccounts, as requested. In a preferred embodiment, when the user customizes a subaccount, he or she then transmits to the card issuing authority the details of the customization for that specific subaccount.

From the perspective of managing the bank account of the webbank owner, these subaccounts are preferably created in the same way that trees of websites are created on webservers, as known in the art, with websites being capable of being linked in any desired fashion. The linkage for subaccounts is a hierarchical one, with a main webbank at top, and subaccounts extending down from that main webbank in upside down tree-like fashion. Likewise, the main webbank account and the subaccount webbanks are each assigned different permissions and access to files and data as is well known for accounts in computer networking.

For example, the main account or main webbank can be considered a directory which is only accessible by the webbank owner and the webbank. This main directory then has subdirectories associated therewith, with the webbank owner having full permissions and access to all webbank subaccounts. Each webbank subaccount, however, has a more limited access to data and more limited controls over the webbank subaccount's functions, as established by the webbank owner. As previously mentioned of course, all functions, permissions, and so forth are subject to the parameters set by and control of the metabank.

These subaccounts are subaccounts designated for different uses by the webbank owner, with different purposes and functions as further described below. In some simple examples, if the webbank owner is a parent, the subaccounts can be provided for children; if the webbank owner is a corporation, the subaccounts can be provided for employees; if the webbank owner is an organization they can be provided for members. In more complex examples, the subaccounts can be provided by any webbank owner for outside third parties, or for specific types of functions, or to segregate certain types of funds or financial powers, or for other purposes, as further discussed below.

These webbank subaccounts can be viewed in some ways as accounts maintained at the webbank owner's "bank"; however, these accounts can be provided with capabilities and functions beyond that of the traditional bank account. For example, each subaccount has customizable parameters associated with that subaccount, which are set by the webbank owner. One such customizable parameter is viewing access, wherein the webbank owner sets the identities of the parties who can view the contents of that webbank subsidiary such as account data or other data. Some parties may, therefore, be provided with the ability to review account data but not engage in any transfers or transacttion (read only). Another such customizable parameters include access to funds, wherein the webbank owner designates who can transfer funds out of that webbank, how much funds, where those funds can go, and so forth. For example, the webbank owner can designate who has the ability to withdraw money (under any parameters so designated); who has the ability to deposit money (under any parameters so designated); who has the ability to reverse a previous transaction, or stop a previously authorized transaction, or so forth. Another parameter includes the authority of a party with access to a webbank subaccount to create sub-subaccounts, i.e. webbank subbacounts off of that webbank subaccount. Other parameters involve financial cards, data storage (e.g. with respect to electronic safety deposit box functions), and so forth. Any combination of these functions or others, customized as desired, can be provided in conjunction with a particular webbank subsidiary.

Thus, permissions, authorizations and passwords can be granted for users by the webbank owner, such that only the users specifically authorized by the webbank owner can engage in specific activities, such as accessing specifically designated subaccounts, and/or such that the user can only engage in the specific activities at that subaccount authorized by the webbank owner. The methods and systems for configuring such permissions, authorizations and passwords are well known within the art of computer networking, with respect to numerous forms of networks, including but not limited to, intranets, extranets, virtual private networks, and so forth, any of which techniques, methods and systems can be used in conjunction with the inventions provided herein.

Not only the parameters of any webbank subaccount, but also any funds within the subaccount, or any programmable card (i.e. customized card) issued therefrom and/or linked to thereto, can also be set by the webbank owner or anyone authorized by the webbank owner. Numerous different types of customizable cards, and webbanks, and parameters for such webbanks, can be set for any subaccounts or customized (programmable) cards as disclosed herein. Numerous such embodiments are also disclosed the present inventor's prior patent applications listed above, all of which are expressly and fully incorporated herein by reference.

As discussed above, preferably each webbank, including each webbank subaccount (i.e. "webbank subsidiary") itself corresponds to a website address, such that a unique website address can be provided to a third party, for the third party's access to that particular subaccount, without providing the third party with information regarding any other subaccount at the webbank owner's main webbank, or with any information regarding the webbank's main account. (In general, it is, of course, desirable that there be a requirement that the third party set a password for access to the subaccount).

The association of each webbank, including accounts and subaccounts, with a webaddress results in a structure wherein each webbank subsidiary can be accessed over the World Wide Web ("the web") and can be controlled and modified over the web. In this manner, segments of a single bank account can be divided, modified, programmed with their own properties, and so forth in unique manners providing an entirely new level of financial functions and flexibility. Moreover, in accordance with the invention, it further results in a configuration wherein any website of any kind on the web, including any website currently existing on the web or websites created in the future, can obtain the ability to instantly send and receive funds, to become a virtual "bank", and so forth.

Each entity provided with access to a given webbank is preferably required to access the webbank over the Internet using secure encryption methods such as those currently well known in the art, and, if desired, using such further encryption and security methods and apparatus as are developed in the future. In one embodiment, for example, upon reaching the webbank, the user logs in with a password and account or subaccount number. In a multilayered or many member entity, such as a business, multiple subaccounts and passwords can be provided within the webbank. The account/subaccount and password (and any other identification technique, whether biometric, computer processor serial number, or so forth) identify the identity of the user to the webbank, and the authorized functions and clearances of the user. The user can then conduct the necessary activities at the webbank in accordance with the authorized functions and clearances provided.

In accordance with the invention, any desired entity can own a webbank or webbank subsidiary or be given access thereto. In particular, such entities can include children, employees, banks, vendors, corporations, organizations, banks, other webbanks, governments (or their agencies or branches), or so forth.

B. Associated Webbank Parameters

In accordance with the invention, any webbank can be customized as to the parameters associated therewith.

One such form of parameter, as discussed below, is the access parameter, designating which individuals and/or other entities have access to the webbank. For each of those entities, the desired level of access can be set. Such parameters indicate, for example, what those entities can and cannot do at the webbank, and what data they can and cannot see.

Numerous other forms of parameters can also be associated with any given webbank. For example, temporal parameters can be set. These include parameters governing the duration of the webbank's existence, including the time that the webbank will come into effect and the time that it will expire. Any temporal parameter can be set as a specific time or as a range of times. Thus, temporary webbanks can be created which are meant to exist for only a short duration or a predetermined duration of time (e.g. to correspond to a specific deal or transaction). Webbanks can be created which will continue operations indefinitely until closed; or which will not conduct any operations until some future time when they will come into existence; or which are available for one time use only; or so forth.

The temporal settings can also include parameters indicating that actions will be taken by the webbank at some designated time or range of time. These actions can be taken automatically or in response to certain requirements.

Functional parameters can also be set. These include parameters governing what functions the webbank can be used for. For example, some webbanks may be set for funds storage, and/or withdrawals, and/or deposits. Webbanks can also be set for association with programmable cards. Webbanks can also be also be set for record keeping and presentation purposes, e.g. as electronic safety deposit boxes maintained by a trusted neutral party (i.e. the metabank), for maintaining secure copies of important records, and for presentation of authenticated materials to third parties. Similarly, webbanks can be set to hold public or private encryption keys and/or to serve as lower level certificate authorities under the metabank, which serves as a higher level authority. Webbanks can also be set as transactional gatekeepers, serving the functions of bill and invoice generation and collection, including the collection of receipts corresponding to a user's transactions. Any given function can be assigned to a webbank, including, but not limited to one or more of the functions described in the present application.

Linkage parameters can also be set. These parameters may govern what other webbanks or traditional networks the particular webbank can link to or have access to.

In addition, logical parameters can also be set. Such logical parameters can include settings in which actions, functions, settings or so forth occur or change in response to certain predetermined conditions.

Any combination of these parameters, or any other desired set of parameters can be set as well, to fulfill the desired purposes of a particular webbank.

C. Third Party Access to Webbank Subsidiaries

With traditional bank accounts, only the account holder has the right to withdraw money from the account, or to deposit money therein. With such traditional accounts, providing outside third parties with access to the account holder's bank account is an extremely risky proposition. The present system allows such rights, however, to be delegated to third parties with minimal risk.

Such third parties include entities that are not metabank employees with legitimate rights of access to the account, nor the account owner. Such third parties can include any entities whose trustworthiness with respect to full access to the account cannot be assured or should not be relied upon (such as strangers, vendors, suppliers, etc.), or which are not traditionally entitled to authority over the contents of the account and all of the funds therein since the account does not belong to them.

In a preferred embodiment, the use of the webbank subaccount/subsidiary model, including the appropriate programming of the parameters thereof, allows third parties to access the webbank at any level desired and at the webbank owner's full discretion. In this manner, third parties are provided with direct access to the webbank owner's bank account, or more precisely, with strictly regulated access to a predetermined segment thereof.

As a result, such third parties can directly make both deposits to the webbank and make withdrawals therefrom. Thereby, third parties are in essence given authority to deposit and withdraw funds from the webbank owner's account. Likewise, other transactions can be effected with and through such webbanks. All transactions conducted on or through the webbank are done in accordance with the parameters and conditions established by the webbank owner, are subject to the parameters and conditions established by the metabank, and result in records being created and stored at the metabank for each transaction or action at a subsidiary. In accordance with further embodiment of the invention, third parties can likewise authorize others to make deposits thereto and withdrawals from the webbank, either by providing them with the appropriate account information, or by creating an appropriate subaccount for that purpose, if the webbank owner so approves.

As an example for illustration purposes, assume a large corporation is a webbank owner that maintains a bank account having $1,000,000 U.S. dollars therein. The webbank owner can provide a third party with the right to deposit money into that account, while barring any right to withdraw money therefrom. The webbank owner creates a webbank subsidiary (subaccount) off of the main account, and customizes the webbank subbacount such that it is set for receipt of deposits only, but without any right of withdrawal of funds therefrom. The third party is then provided with the subaccount number of this webbank subsidiary (preferably a webaddress). Using that subaccount number, the third party can then transfer funds into that webbank subsidiary, but not withdraw funds therefrom. Preferably, the deposit is via a transfer of funds from the third party's webbank to the webbank subsidiary. Alternatively, the transfer can be via a wire transfer into a bank account, since each webbank subsidiary corresponds to an bank account at the metabank, which has the rights of a traditional bank. The money deposited by the third party is created to the webbank owner's bank account, without any risk that the third party will withdraw funds therefrom.

In one embodiment, the webbank subsidiary can be customized to recognize particular third parties only, if desired, with the third parties entering by inputting a user name and password. In an alternate embodiment, the subsidiary can be open for receipt of funds from any party whatsoever. Thus, a webbank subsidiary can be open for public deposit of funds thereto, e.g. for donations to a particular cause, or so forth.

Likewise, a webbank subsidiary can be provided having rights of withdrawal therefrom. As an example, the webbank owner may wish to provide a third party with $100 dollars, which the third party can withdraw at will from the webbank owner's bank account, without risk that additional funds will be taken at that time or in the future. A webbank subsidiary is created off of the main account with access rights to a maximum of $100 from the main account and no more. The third party is then given withdrawal rights from the webbank subsidiary, allowing the third party the right to withdraw that $100 (or any portion thereof) at will.

If desired, the third party can be given deposit rights and withdrawal rights, as in the case of a loan for example. The webbank subsidiary therefore becomes a financial tracking device and transaction record as well, serving as a record of the amount of funds withdrawn, and as a record of the funds repaid, so that there is no ambiguity or uncertainty about whether the loan was repaid and when.

Any other series of parameters can likewise be provided with respect to third party access to a webbank subsidiary, including issuance of customized credit and cash cards and so forth.

D. Private Financial Networks

As a result, in accordance with the invention, a new method and system for electronic commerce and electronic banking is provided in which new private financial webs or networks can be created, which are modifiable and regulated by its users.

In accordance with the invention, any subaccounts of the webbank can be linked to a list of publicly viewable accounts; or to other subaccounts only viewable by certain parties or only by the subaccount owner or authorized users; or to publicly viewable information, or to information only viewable by certain parties or only by the subaccount owner or authorized users; or to any other subaccount (whether at that webbank or elsewhere) or to any other information or website desired.

As part of this financial web, as an example of another function preferably available to the webbank owner (and to other users designated by the webbank owner) is the ability to link and unlink accounts. For example, the webbank owner can link subaccounts with other card holders or other accounts or subaccounts on other webbanks (with the permission of the second party and the respective action on the second party's side), and/or can create webbanks which are jointly owned such that they correspond to joint accounts with other card holders or accounts or subaccounts of other webbanks. The owner can create passwords for second parties to use, allow the second party to generate its own password, and/or have the software or the card issuing authority/financial institution create the same. All such actions are preferably accompanied by the tranmission of the appropriate information regarding the same to the overseer bank, preferably automatically by the webbank to the overseer bank as the function or transaction is conducted.

The webbank owner can review activity on his/her account and any joint account he jointly owns, can directly arrange wire transfers with any other webbank, and can transfer money into a joint account for the second party to withdraw when ready or under certain conditions. The seller can be able to set up its own password to access the funds, or can be assigned a password, the password exchange, for example, being sent by email or by a connection between the buyer and seller, or through the overseer bank or so forth.

Records of all transactions are forwarded to and maintained by the metabank. In addition, any records in any webbank, any records of transfers, etc., which are preferably maintained on a website, can interface or be linked with other databases, including, but not limited to, accounting programs, inventory programs, shipping programs, and so forth. Webbanks can utilize XML or any other suitable programming language such that the information therein is share with any suitable databases desired.

In addition, in a further preferred embodiment, the webbank owner can surf and see other webbanks that are listed by webbank owners on the financial webbank network. Some such webbanks may be publicly listed. Other entities, on the other hand, may keep private webbanks. Likewise, many individuals and entities may keep one or more listed public account or subaccount and one or more unlisted private account or subaccounts on the financial webbank directory. Other parties can then email to those accounts or subaccounts or transfer information or funds to the same. Some accounts or subaccounts can be open for unrestricted transfers in; others will require preclearance for transfers or may only allow transfers to certain individuals or under certain conditions, or so forth.

When funds are transferred or actions taken, webbank owners or users with access to a particular webbank can further verify or view information on other side of a particular transaction (e.g. whether their money received, when sent etc., and so forth). In one of the preferred embodiments of the invention, with either a webbank subsidiary or a joint account or a linked subaccount, or with a public subaccount, a user or owner of the webbank can also go directly to a seller/buyer (e.g. by accessing the records of the appropriate linked subaccount or the joint account or subacount) and verify the records regarding whether the money was sent and/or received by that party. Thus a party can check whether funds were received by the payee and transferred out (i.e., "cashed" by the payee). Or a party can check whether funds were mailed out by the payor (i.e. by looking for an authorization or indication on the subaccount or the joint subaccount that an authorization transfer has been entered). Those records, though private to most users, can be set up as "public" or open to the other party involved in the transaction. In one such embodiment, access can be set up so that a party can logs in with an account number and password and requests information from the other party's webbank.

Parties can also create open linkable and closed linkable accounts and subaccounts. For example, in a closed linkable subaccount, the funds can only go from subaccount x to subaccount y and to no other, to prevent fraud. In an open linkable account, the funds can go from subaccount x to any other account or subaccount. A party can also create conditionally linkable accounts and subaccounts, in which funds can only go to certain types of accounts or subaccounts (e.g. user receipt verifiable, or insured, or so forth), or can only be linked in certain ways or subject to certain conditions. This can further be used a fraud protection method.

Any number of accounts can be linked or networked in accordance with the invention, and can be linked or networked in any manner desired. Thus, a company can transfer money from its webbank into an employee's webbank, if desired. Likewise, any group of individuals or entities can link or network their accounts in any manner desired.

Thus, network links can be customized, as desired. For example a one way network link can be provided or a two way network link. Links can only allow certain types of money or parameters. Likewise the joint subaccounts themselves can be customized to only allow certain types of money, parameters, transactions, or so forth.

The accounts can further be set up such that tracing is available as well to trace where funds went from, from one account or subaccount to another, and where along the way, or so forth. Some funds, for example, can be set up with a tracing parameter of a certain number of transfers. For example, the requirement can be entered that the data regarding the first two transfers (or three or so forth, or any other desired number) must be logged back to the originator's website before the transferred funds can be accessible to the recipient. Or the requirement can be set forth that all transfers of the funds must be logged back to the sender until the funds reach a certain designated recipient, or for a given period of time, or so forth.

As one example, a two trace parameter can be used with two directly linked subaccounts. After the user transfers the funds to a linked subaccount, two traces must be received back before the transferred funds are open for use by the recipient. The first trace records the transfer from the webbank owner's subaccount to the recipient's subaccount. The second trace records the transfer from the recipient's subaccount to the recipient's main account. Although the webbaml owner will not receive details of the recipient's main account or main account number, the webbank owner will receive verification that the funds were transferred through both steps. The overseer bank will preferably receive both verification and the account information and verifications. Thus, the overseer bank, as part of the tracking, will further receive details as to which accounts the funds were transferred between, by whom, when, and so forth, as desired. Preferably, the funds are blocked until these steps have been completed. Once they have been, the overseer bank can "open up" the funds as being available for use by the recipient and no longer blocked.

Funds on the website bank can be held or invested as the owner of the webbank desires to provide the return or rate of return that the owner wants to try to achieve (e.g. in money market accounts, stocks, bonds, etc.). In the preferred embodiment, each of these investments can be maintained in separate subaccounts linked to the user's main account. In joint subaccounts, either the initiating party or the receiving party or both parties can set the parameters of what occurs with the funds. Such parameters include the investment parameters of the funds on hold For example, each party can control the investment parameters of half the funds, or the initiating party can control the investment parameters of the funds, or so forth.

IV. Asset Forms and Transfers, Including Payment Mechanisms

With the webbank being as a member of the metabank's financial web (which is provided on the Internet), and with the metabank further being a traditional banking establishment which is a part of the traditional banking networks, many new and novel payment systems can be provided which are a significant advance over the current art.

Various companies have existed for years in the art for the purpose of handling and/or processing payment of bills, such as payments by consumers to businesses, or other transfers of funds. Checkfree, for example, is a commonly available bill payment service which is accessible to consumers using a touchtone telephone or a personal computer and a modem. Subscribers send their payment information and directions to Checkfree or to a bank which utilizes Checkfree's services. Checkfree then sends vendors a laser printed check through the post office or else sends instructions using the existing U.S. Federal Reserve or MasterCard RPS system to transfer funds electronically from the checking account of the subscriber to the creditor. Such services can thereby assist the consumer or business with bill payment.

However, such services have traditionally had numerous disadvantages associated with them. As one important example, such payment services are not capable of providing realtime, instantaneous electronic funds transfers from any party to any party in the world.

This is due to the fact that the majority of creditors today (including private individuals, merchants, corporations, and so forth) are not capable of receiving or processing electronic payments. While very large institutions (such as major credit card companies) are sometimes configured for receiving payments by electronic funds transfers, the majority of vendors, such as smaller corporations, merchants, and individuals, are rarely so configured, if ever. Even many medium or large corporations are not set up for receiving any volume of such electronic payments.

Likewise, most smaller and mid-sized entities are not geared for electronically wiring or sending money on any large or regular scale. Such entities may occasionally send a wire transfer, but even such wire transfers require waiting in line at their bank. While a user can sign up at times for bank services which allow wire transfer authorizations to be faxed in, setting up such services can take weeks to be processed. Moreover, even when such services have been set up, the entity still must fax in a typed or handwritten form to the bank which is then processed by the bank later that day or sometime the next day.

As a result, most payments currently made by consumers or businesses are conducted using written or printed checks. Indeed, even those entities which provide bill payment services over the computer (such as Checkfree) do not actually electronically transfer the funds to the recipient in most cases, but merely print out and send a check on behalf of the sender.

In contrast, using the Company's present inventions, a customer can simply and easily transfer funds to anyone for instantaneous receipt virtually anywhere on the globe.

Moreover, the transfers of the present invention do not merely involve an instantaneous authorization to pay, but rather, include an instantaneous receipt of the funds as well. Furthermore, the funds once instantaneously received are also instantaneously deposited into the recipient's account, and instantaneously cleared as well. This is in significant contrast to the current checking system, where a check sent to a creditor can take days to travel through the mail, then days to be taken to the bank and deposited, then further days until the check is cleared and the funds available to the recipient.

The metabank and webbank system provides customers with the ability to quickly setup and conduct such instantaneous realtime transfers with any third party using a computer connected to the Internet and without needing any additional additional investment in technology. Thus, by using the invention, any party can easily and instantaneously electronically transfer funds to (or from) any desired entity merely by using an Internet browser. The invention can be utilized regardless of the size of the sending party or the receiving party—no entity is too small or large to send or receive an electronic funds transfer.

A. Webbank to Webbank Transfer

In accordance with a preferred embodiment of the invention, electronic funds transfers between a sending party and a receiving party are accomplished by conducting a transfer of funds between two parties' webbanks. The sending party utilizes its webbank to quickly and electronically transfer funds to the webbank of the receiving party by accessing the receiving party's webbank over the Internet. The use of the webbank eliminates the need to specifically configure the sender for the ability to wire money electronically, or to configure the recipient for the ability to receive money electronically, since the webbanks disclosed herein are designed to be inherently capable of sending and receiving funds. All transfers and exchanges of information between two webbanks likewise involves the forwarding of information to the metabank regarding the transaction.

In the preferred embodiment, each transfer of funds from a webbank to another webbank preferably also involves a concurrent transfer of information corresponding to the two webbanks between the two webbanks as well. The receiving webbank, in addition to the funds received, also receives a record of the webbank address of the sending webbank which is associated with the record of the funds received, while the sending webbank maintains a record of the webaddress of the recipient webbank along with the record of the funds debited. In addition, in further embodiments, the two webbanks exchange information regarding the identity of the sender and of the recipient, which is also associated with the funds received. Thus, while the transfer is being set up the sender provides data regarding the recipient's account, but also "sees" on the screen data regarding the recipient corresponding to the account (preferably webaddress) designated. This avoids the current problem which occurs periodically in the present art in which wire transferred funds are sent to the wrong party because an account is off by one or more digits or so forth.

Preferably, when the sending webbank designates the recipient webbank that the funds are going to, the information that is displayed regarding the recipient is the information associated with that webbank that has been designated as "public information," which provides the doublecheck provided that the recipient is the correct one. Other information can come up as well, if desired, including private information which is shown based on the identity of the sending webbank.

As previously discussed, in the preferred embodiment the metabank serves to oversee and manage the webbanks provided to users. Any transfer of funds between webbanks thus merely results in a corresponding transfer between two subaccounts of the metabank, merely moving funds around within that overseer bank. Accordingly, instantaneous commerce is further provided.

In an alternate embodiment, more than one metabank can be provided. In this embodiment, individual metabanks maintain a permanent and continual communication among themselves, or repeated communication many times per day, to effect instantaneous or else rapid transfers, rather than merely settling accounts at the end of the day or sending out wire transfers at one time which is the current practice in the art. In this embodiment as well, transfers between webbanks result in instantaneous or rapid transfers between the accounts of the corresponding metabanks.

Thus, in the preferred embodiment, thes transfers of funds or any other information can be preferably be conducted instantaneously between any two webbanks. The degree of speed for the transfer can be any time interval designated by the metabank—thus, a transfer of funds can be done in seconds if desired, or within one, two, five, ten or thirty minutes, or within one, two, four, or eight hours, or within the day, or two days or any other amount of time desired. This is in contrast to the current methods for wire transfers used in the art, in which a wire transfer of funds by a consumer or business transfers usually takes a day or more, and are rarely if ever is within seconds or minutes.

Transfers of funds or other assets between webbanks can be conducted using any technology for electronic transfers of funds over the Internet previously or currently known, or devised in the future. Likewise, any of the activities and inventions previously disclosed by the inventor in his other patent applications (including the applications listed above, all of which are expressly incorporated herein by reference), can be used in connection with the webbank.

In the preferred embodiment, any transfers of funds, for example, between two webbanks preferably results in a corresponding transfer of information on the records of the metabank's computers. Thus, the metabank's computers record the withdrawal of funds from one account and the deposit in another account, in nearly instantaneous fashion. This is in the same manner that, as is well known in the art, a user on a computer network can access the network and transfers files or data on the server (e.g. from one directory to another) or can transfer files from one computer to another on the network, or can transfer files between directories on another one of the network's computers. Likewise, a user can rapidly deposit money in another account in the same way that information or files are sent to, uploaded to, copied into, or cut and pasted into, another computer or directory. Likewise a user can rapidly withdraw money from another account in the same way that information or files are retrieved from, downloaded from, copied out of, or cut and pasted from another computer or directory.

In further embodiments of the invention, such webbanks can be used to transfer money between individual webbanks. In one embodiment, such transfers are conducted using encrypted data exchanges between the webbanks. In other embodiments, transfers of information and money between webbanks are conducted using the XML language (or another such suitable language) to interface data between such webbanks and some or all of their underlying databases.

Thus, pursuant to the invention any party (preferably using an Internet browser) can transfer money, and make payments from an account. Moreover, such payments can be done instantaneously, and without using a credit card.

B. Traditional Wire Transfers

Owing to the fact that each webbank is preferably linked with a subaccount number at a traditional bank (the metabank), any webbank can likewise be used to transfer funds in a more traditional manner, i.e. over the traditional networks for transfers of funds between banks.

The present system provides the advantage that such wire transfers can be directly conducted by the webbank owner (or authorized user) over traditional networks if desired by inputting the desired information regarding the recipient's account into the computer at the webbank itself (or accessing the recipient's webbank), rather than having to wait or stand in line at a bank to conduct a wire transfer, or fill out a form which is at some later point processed by a bank employee. Such wire transfers using webbanks can therefore be more efficient or more rapid than traditional wire transfers, although they can still suffer from speed disadvantages owing to the structure of the current funds transfer systems. Thus, a webbank owner can authorize the sending of funds rapidly or almost instantaneously, although the time it takes for such funds to be received will depend on the particulars of the operation of the traditional fund network in question.

C. Assymetrically Encrypted Funds Transfers

In one of the embodiments of the invention, transfers of funds and other information between webbanks can be conducted using asymmetric encryption technology. Such encryption can be effected for various purposes, whether for security, to ensure use by only the desired recipient, to designate uses or purposes for the funds, permissible spending locations or times, or so forth.

In one example, a webbank owner may wish to send another entity an "electronic check" for instantaneous deposit to the appropriate account on the recipient's webbank. This recipient's account can be a general account setup for receipt of money from any party, or a specific account set up for receipt of money from that particular webbank owner. In one version of this embodiment, money is transferred from one of the subaccounts on the owner's webbank to one of the subaccounts on the webbank of the recipient. This transfer of money or funds is asymmetrically encrypted.

On the webbank itself, e.g. in the main account and/or on webbank subsidiaries where appropriate (and/or in a separate location on the metabank's server, and/or on the owner's personal computer), each webbank owner preferably maintains a copy of its own private key corresponding to that particular webbank. In addition, the webbank owner lists a copy of its public key in an appropriate location—e.g. on its webbank subsidiaries or any other designated site at the metabank. That public key can be the public key for some or all subaccounts and/or for certain types of subaccounts, and/or for certain types of transactions, and/or the public key associated with certain types of parameters for the funds.

In one embodiment, for example, to conduct a transfer to a second party ("the recipient"), the webbank owner ("the sender") first accesses the recipient's webbank. In the various embodiments of the invention (whether transfers to parties, withdrawals from parties, etc.), the sender accesses the recipient's webbank by typing the recipient's webbank's webaddress (or more specifically the webaddress corresponding to the particular subaccount at the recipient's webbank) into the appropriate field of the webbank owner's browser (or clicking on an appropriate hyperlink). Similarly, the sender can merely choose the recipient's webbank subaccount off of a list. This list can be an entry which has been added to the webbank owner's list of accessed accounts or favorites, in the same manner that "favorites" are stored in current Internet browsers; or it can be any lists of email and webaddresses that are stored on computers and in various application programs; or it can be some list available over the Internet, e.g. through a search engine, or on a specific directory; or it can be the webbank subaccount address provided on or linked to any traditional websites (e.g. the recipient's website where it advertises goods and/or services for sale); or can be an address forwarded by email; or can be any information stored or provided in any other way desired.

Once the sender has accessed the recipient's webbank, it can link to, and download a copy of, the recipient's public key. The sender then encrypts the money being sent to the recipient using that public key and sends that money to the recipient over a secure, encrypted, connection. The encrypted money is then deposited into the recipient's subaccount. That money can then only be decoded using the recipient's private key, for use only by the recipient. Once the money has been decoded, the recipient can encode it in any manner desired, e.g. for storage of that money or of any part thereof in any desired account or subaccount on its webbank, or for forwarding of that money or any part thereof to any desired party. The money can be decoded automatically at the recipient's webbank upon receipt, if desired, or can be deposited for decoding by the recipient upon executing the appropriate command at the webbank to retrieve some or all of the funds deposited to some or all of the recipient's subaccounts. Preferably, the steps of accessing the private and public keys, and encrypting and decrypting the data, and so forth all occur in the background so that the sender and recipient need not worry about the particulars, nor have to physically access individual functions to run those processes.

D. Assets as Encrypted Strings of Numbers or Otherwise

In one embodiment of the invention, all exchanges of money or funds between parties occurs wholly at the metabank's computers upon receipt of instructions from one of the webbanks. In such an embodiment, a first webbank sends instructions to the metabank that funds are to be sent (or withdrawn or so forth) to a second webbank, by designating the webbank address, and the metabank credits (or debits or so forth) second webbank's account accordingly.

In an alternate embodiment, funds can be transferred between parties in the form of data sent directly from a first webbank to a second webbank, with the information sent thereafter to the metabank. Preferably in this embodiment, however, the information is also sent concurrently to the metabank at the same time as it is sent from the first webbank to the second.

The form of the "money" or assets transferred between webbanks can take various forms. In one embodiment, a party can designate an amount of money that is to be transferred, and communicate the same to the server of the metabank. The server then provides an encrypted number corresponding to that amount of money. The first party can then send the second party the encrypted number (and possibly the amount of money it corresponds to as well, and/or a PIN number). The second party can then send to the server the encrypted number (and preferably the amount of money and/or a PIN number); if the server verifies the data received, it deposits the money into the second party's ccount, and closes the transaction. If desired, merely an encrypted number can be transferred; however, an amount of money as well and/or a PIN number can be used for added security. In alternate embodiments, the encrypted number can be transferred further from the second party to a third and so forth, before it is redeemed at the metabank.

In a further embodiment of the invention, the number is a webaddress corresponding to a website. That webaddress corresponds to the amount of money designated by the sender. In this preferred embodiment, to transfer money a webaddress is sent from one party to another. That webaddress correponds to a webbank account (e.g. a temporary account) having the amount of money desired for transfer located therein. In one embodiment, the account is created for one time use (just this particular transfer), and contains only the amount of money desired to be transferred during this transaction located therein.

This webaddress is encrypted and sent to the recipient who decrypts it, accesses the money, and transfers it into his or her own account. Preferably the webaddress is encrypted using the recipient's public key, for decryption by the recipient using his or her private key, as discussed above. In an alternate preferred embodiment, for speed purposes, a symmetric encryption algorithm is first applied to the webaddress to encrypt the webaddress. This symmetric algorithm is encrypted using the recipient's public key, and then the encrypted webaddress and encrypted algorithm are sent out together. At the recipient's side he or she decrypts the algorithm using his or her private key, then uses the algorithm to decrypt the webaddress, which webaddress can be used to access the money and have it moved into the recipient's own account.

In one embodiment, when the recipient decodes the webaddress he or she then forwards that webaddress to the central overseer bank, with his or her own webaddress to initiate the transfer of funds from one webaddress (or account) to another at the central overseer bank.

In an alternate or additional embodiment, the sender can merely send a first webaddress (with the funds in that account) and a second webaddress (where the funds are to go) to the metabank, where the transfer is initiated upon receipt of the information, crediting one account/webbank and debiting another as indicated above.

In any of the embodiments of the invention, when any party sends a webaddress or so forth to the other party, it is preferred that the same information be likewise simultaneously forwarded to the central overseer bank's server, preferably with information containing the identity of the sender and/or the recipient. Information regarding the identity of the recipient can be used for future verification when desired, when the recipient receives the webaddress information from the sender.

Or, more simply, webaddresses can merely be sent over directly, from one party to another, in any manner desired.

Preferably, transfers from one account to another (with the associated decryption etc.) is a seamless simple process where one party designates the amount of money to be sent (or withdrawn etc.), the location where the money is to be transferred to, and requests an execution of the transaction.

The webaddresses themselves (which are preferably very long random sequences of data) can be obtained by owners and users of the system by numerous means. For example, a webbank owner can send a message to the server, indicating the amount of money which it desires to transfer. The server can then respond with the webaddress into which that amount of money has been temporarily deposited (transferred from the sender's account). If desired, the sender can have a series of temporary webaddresses allocated to it for precisely this function, which are either provided in advance, or upon request when the sender wants to send money.

As previously discussed, in accordance with the invention, a webbank owner can likewise permit third parties to withdraw funds from the owner's webbank, if desired. For example, a webbank owner can create a subaccount on his webbank for access by a third party, wherein only the third party is provided with the subaccount's secret webaddress. The webbank owner can then access the webbank of the recipient and download the recipient's public key (or, in any of the embodiments of the present inventions, retrieve the recipient's public key from any other source, just as the recipient's subaccount can be retrieved from a variety of sources). The webbank owner can then encrypt the desired amount of funds and deposit it into the recipient's subaccount at the owner's own webbank.

When the recipient wishes to withdraw money, he or she merely accesses his or her secret subaccount at the owner's webbank using his or her Internet browser. If desired, a password and identification can be required for access, which is set by the webbank owner or by the funds recipient). Upon accessing the secret subaccount website, the recipient then decodes the money using his or her private key. The money, as previously discussed, can be a number which is recognized by the overseer bank as corresponding to a certain amount of funds in the webbank owner's account and/or can itself correspond to a further webaddress. The recipient of the funds can then transfer or manipulate the money in any manner desired, subject, if applicable, to any parameters or restrictions set by the webbank owner when he or she deposited the money. Part or all of the money can be withdrawn and transferred elsewhere, if desired, with the remaining money, if any, encrypted by the recipient and left in that subaccount of the webbank owner.

In this manner, for example, an owner can leave money for access by someone else, which the second party can withdraw from or use as desired. Until the money is accessed by the second party, it remains within the authority and jurisdiction of the webbank owner, unless the webbank owner sets the parameter of the money as irreversible back to the webbank owner.

All transfers of money of any sort are preferably verified at the metabank server(s) by comparing the information provided by the webbank owner or sender (including the intended destination) to the metabank server, with the information provided by the recipient (e.g. the information downloaded into the recipient's account) to verify and confirm that only the intended recipient has received and downloaded the information. In the preferred embodiment, records are maintained on the metabank's servers, and also at the user's personal computer for backup purposes.

Moreover, as described in the inventor's prior applications, the party manipulating the money or arranging the transaction can set any parameter desired to the funds. For example, transactions can be reversible or irreversible, if desired, by setting appropriate parameters with the money, and sending the appropriate messages to the metabank server indicating the parameters of the transaction.

Parameters of a transaction can be provided using an assymetric encoding system, and/or by providing parameter information which is itself associated with the numbers corresponding to the money in the individual webbank accounts. For example, in one embodiment, a subaccount can be created on a party's webbank which is expressly for purchasing CDs, that subaccount having its own public and private key associated therewith. Likewise a subaccount can be created on a party's webbank which is expressly for selling CDs (or any SKU), that subaccount having its own public and private key associated therewith. Various parameters can be provided, as described in this inventor's prior applications, any or all of which can be associated with one or more public/private key pairs. Alternatively, any parameter desired can be encoded into the numbers corresponding to certain funds, using a secret keys or systems known only to the metabank overseer bank, with the overseer bank checking a transaction which is attempted to verify that it comports with the rules set in the parameters associated with the money therein.

Using the webbank, transfers can also be anonymous, if desired, such that it does not specify the sender and/or the sender's address, or such that it is conducted by the sender without knowledge of, or being able to determine the recipient or withdrawer of funds. Or a transaction can be conducted anonymously initially, with the sender (or recipient) later having the opportunity to disclose or reveal its identity, e.g. by allowing the sender (or recipient's) to apply its private key to the data sent, and sending back information regarding that data to verify that that the sender (or recipient) was able to decode it.

In a further embodiment, a unique number or account can be used for each transaction, if desired, or each type of transaction, such that interception of or decryption of an account number will not compromise any other transaction, or any other account. In further embodiments, parameters can be defined for different account types, as to the type of purpose the funds can be used for, when they can be used, and so forth, as further discussed herein.

V. Programmable (Customizable) Financial Cards

In accordance with further embodiments of the invention, customized financial cards are also provided herein. These financial cards can be customized or "programmed" by the user (preferably over the web) such that they are only suitable or usable for particular subuses, for particular subframes of time, or so forth. This differs from the present practice in the art, which is to have financial card numbers (such as credit card numbers) which are valid for all uses, and for all periods of time until the card expires. Although the term credit card is frequently used hereafter, the intention is to include credit cards (which includes charge cards), and debit cards by that term, unless otherwise stated. In addition, the present inventions could be used with any other form of financial cards used for purchases or transfers of funds, as well.

For example, in the current practice in the art, for example, employees frequently make payments which are later reimbursed by their corporation. In accordance with the present invention, their corporation can issue customized credit cards, or obtain customized credit cards from a credit card company, which can serve certain limited uses, functions or so forth. This card can be customized in any of numerous ways. For example, the customized card could be set to be valid for a certain limited number of dates or until a certain date. For example, if an employee is going on a business trip for two days (or some other amount of time), the card could be set to be valid on only those two days. Thus, the employee is authorized to use the card for charges on only that time that the employee is away on the business trip, but not for any other time. Thus, in accordance with these embodiments, the card can have a user customized range of dates or series of dates. In one embodiment, this is a range of dates with a commencement date and expiration date. (This is useful, for example, if an employee is going on a business trip, one or more cards could be issued which are valid for the dates of the trip, with the card not being valid before the trip starts or after the trip ends). In another embodiment, the card becomes valid at any specific time (even a time of day) and ceases to be valid at any other specific time. Likewise, the card could become valid for a series of ranges of dates, even dates which are non consecutive or non contiguous. For example, it could be valid for a specific day or series of date in March (for a first business trip), become deactivated once that trip is over, can be reactivated for a specific day or dates in June (for a second business trip), be deactivated once that trip is over, and so forth. It could also be valid for a specific predetermined amount of time. For example, it could be valid for any one week period, beginning from when the user or subuser uses first uses it.

The card can also be customized for only particular uses or groups of uses. In this manner, the main cardholder (e.g. a corporation, a parent, etc.) can determine in advance what the card can or should be used for. For example, the card could be customized so that it is only good for airline reservations, such that if the employee tries to use it for any other type of charge, the charge will be declined, regardless of the amount of the transaction involved. Or the card could be customized so that it can only be used for airline and hotel charges. The types of uses which can be provided include any type of use that is currently charged or could in the future be charged on a credit card, or any combination of the same, including any desired current or future category of uses. Currently, charges which are placed on cards include airline, hotel and car rental charges, restaurant bills, retail store purchases, and so forth. Or, the card could be customized just to allow certain particular stores, certain particular charges, or so forth.

The card can also be customized for use only by a specific individual, by certain groups of individuals, or so forth. A parent could provide a customized use card which is for use by his or her son or daughter, a corporation could provide a customized use card which is for use by employees, an organization could provide a customized use card for use by employees and/or members and so forth. Different cards or customization parameters could be provided for officers, board members, executives, or so forth.

As one example, an employee could be given authorization to purchase a new computer system. A customized credit card could be issued to the user which is only valid for use for that particular type of charge (computer hardware and software stores) and to the credit limit decided by the issuer or authorizing party at the corporation, such that if the employee tries to use it for anything else or for a charge in excess of that authorized, the charge will be declined. The card could even customized for use in a particular store itself or a particular chain of stores (such as a particular restaurant, or a particular chain of restaurants). Any of the features in the present application can also be combined—thus, the employee could be given a card for use in any computer store which is good for a total purchase of up to, for example, $2000 in value.

As another example, a parent could give a teenage child a card to go out and make a specific purchase for the child or for the parent. The card could be valid only for purchase on that particular day, to a certain designated purchase limit, and even, if desired only in a certain store, or group of stores or types of stores (e.g. clothing stores), or types of purchases or items. The main account could have, for example, a $1500 credit card limit, but the parent could set a $100 limit for use of the customized card on that particular day. Thus, if the card is lost or stolen, the card can not be used at stores other than the types chosen by the parent. Use in any other type of store or on any day other than that one day will cause the card to be declined. This minimizes the amount of credit card loss which can occur, and increases the chances of catching the thief. Likewise, the sublimit of $100 also minimizes the amount of loss which is possible.

The card could also be customized to be valid only in a particular region. For example, if the employee is going on a business trip from New York to Florida and back, the card could be set to be valid only in the States of New York and Florida, and not to be valid for charges in any other locations. If the card were lost or stolen en route, e.g. in a stopover in Georgia, and the thief attempted to use the card in Georgia, the charge would be declined, irrespective of the amount involved.

The amount of credit on the card could be as high as the credit on the main account, or alternatively, could also be customized. The main cardholder (e.g. the corporation, the parent, etc.) can set how much credit is on the particular card for the subuser (e.g. the employee). This can be done in some fixed manner, on the basis of some formula, or so forth.

Self transfer of funds and customization by the corporation or the user of the card is preferred. In other words, the corporation determines what uses and/or amounts are set on the credit card up to the corporation's total credit card limit.

In one embodiment, with respect to customization, the user receives one or more credit cards, each of which is inactive. Each card has a blank amount of credit, and no predefined use, i.e. the card initially has no credit available on it at all and no use available to it. When the user receives the credit card, or when the user is ready to activate the card, the user determines how much of his or her available credit he or she wants to transfer onto that particular card and what particular uses or types of uses are desired (or even all uses, if desired). For example, the user may decide that he or she wants to go to a particular place or store that day and have a certain amount of money with himself or herself (or wants to send his or her employee with a certain amount). In addition to or in place of carrying cash, the user could carry a card having a predetermined amount on it, and could even, if desired, set the places or types of places where the card will be active.

In another embodiment, a user can designate a single sum for use over a plurality of cards. This method overcomes a variety of problems present with the current methods of the art. For example, if a individual or couple wishes to go on vacation abroad, they often purchase traveller's cheques in any of a predetermined limited number of denominations (e.g. twenty, fifty, one hundred dollars, etc.) When using those cheques to convert money the couple often may not wish to convert the full sum (e.g. the full fifty dollars) at that one time, in that one place, or at that day's exchange rate, etc. Alternatively, the couple may be purchasing an item from a store, and the full cost of the transaction is often some odd number which is less than the denomination on the card. In this case, the individual or may not want to receive change back from the vendor in cash, since the vendor may be providing a disadvantageous exchange rate, or so forth.

Accordingly, in this embodiment, a single sum can be "distributed" over a plurality of cards. In this manner, the user designates a particular sum, and each of the cards in that plurality can draw upon that sum. The use of that card reduces the total sum available for the next cards in the series. In this manner, a user can use the customized or the disposable card for transactions whose sums do not amount to a whole number.

As a security feature, in plurality of card embodiments such as the former, it can be preestablished that not more of a certain percentage of the total sum available can be used on a single card, or can be used without verification of identity. For example, a 50% or 20% single use ceiling (or any other number) can be set by the credit card company or the user, to further guard against loss due to fraud. In this embodiment, if a transaction is attempted with any one card which is in excess of the predetermined ceiling for a single card, the card use can be temporarily blocked or subject to verification of identity, to verify that the card was not stolen and being used illegally for large transactions.

As a further security feature and customization parameter, the card can be set to have a desired level of security which must be comported with by the vendor for the transaction to be authorized. For example, some cards or transactions could require merely a signature, some could require the fingerprinting mentioned herein, some could require a showing of identification (including, if desired, picture ID) or so forth.

As discussed elsewhere herein, all cards in the series can be linked such that, if the cards are stolen, one call will cancel all of the cards.

As another formula, there can be also be a total available credit set by the corporation as customized for the year (or for some period of time, or for a particular trip, etc.) for a person, or for an entire department, or so forth, which can either be on one card, or distributed over several cards, as explained above.

Other combinations can be provided as well. For example, the card can be set such that there are certain combinations of customizations available. For example, each subuse can be associated with a specific credit limit for that subuse on that one credit card. Thus, the user may be told that he or she can spend up to $500 on air travel, $1000 on hotel rooms, $300 on car rentals, and those limits can be programmed into or preset to the card. Other combinations of dates of transactions, types of transactions, amounts for individual and/or total transactions, etc. on a single card, or on multiple cards, can be set as well.

If desired, the customized card could be preset or such that any purchases can only be delivered to a specific shipping address (e.g. the address of the corporation). Likewise, since the card is a customized card, any other special conditions of any sort could be attached to the transaction as desired or needed.

Many other embodiments or parameters can be implemented on the card as well. A card can be issued to an individual, or to a department. Or, a group of cards can share a single credit limit. A card can be customized such that, when items are purchased by phone or over the Internet, etc., the only shipping address which will be accepted is a preset shipping address already assigned to the card (e.g. by the main cardholder). A card can be set to have a fixed maximum per transaction limit. It can be set to allow, or disallow cash withdrawals. A card can be set to send out a notification to the main cardholder upon each purchase, or upon each purchase meeting certain criteria (e.g. over a certain limit, pertaining to a certain category, or so forth). The notification could be set to include certain required information, e.g. when it was used and/or where it was used and/or how much credit is left or any other information desired. Likewise, a preapproval can be required before every purchase or before certain purchases, such as purchases over a certain limit, or purchases of a certain type.

Likewise, a card can be encoded for multiple uses or types of use. In one such embodiment, the card can be encoded such that it can be used for other magnetic card systems as well. For example, the customized card could be encoded such that it can also be used in place of some other existing card, e.g. as a metrocard (i.e. a fare card on the New York City subway system), as an EZ Pass (i.e. a card which is used to drive through tolls in New York or elsewhere), or so forth. These multiple use cards could either have a preset amount on them (as a debit card of sorts), or they could interface with the other existing card system (whether the Metrocard system, the EZ Pass system, or so forth) such that upon use of the customized card, the funds are taken out of the user's credit card account.

Or, in another variation on this embodiment, multiple brands of cards can be bundled together on a single customized card for ease of use of the user. The term "brand" is used herein to refer to the general card issuing authorities, whether Visa, Mastercard, American Express, Discover, etc. or to more specific issuing authorities, e.g. Citibank Visa, MBNA Mastercard, etc. In this embodiment, Visa and/or Mastercard and/or American Express etc. card accounts can be bundled together on a single credit card. When the user presents this single card to the vendor he or she has the option to decide which of those brands' account(s) on the card he or she wants to use for the transaction. This reduces the number of cards the individual has to carry. A single transaction could even be broken up among a series of cards if desired with the transaction statement indicating for example that $200 out of the $600 dollar purchase was charged to the Visa account, and an equal amount to the Mastercard and Amex accounts. Or, the main account holder could set up the card to be capable of some fixed total amount of charges (e.g. $1000) with the user free to use any of the accounts on the card in any combination desired to charge up to that amount. This is useful if some establishments accept only one or two of these brands, allowing the user (e.g. the employee, the child, etc.) to use the customized card as establishments that accept any of the brands on the card. Or, for purposes which may be beneficial to the main account holder (e.g. for purposes of frequent flyer mile programs, membership dollar programs, etc.) the customized card could be set up such that all of one or more subtypes of use is charged onto one brand, all of another or more subtype onto a second brand etc. For example, the card could be set such that all airline charges are charged onto the Amex Card, all retail store purchases to the Visa, all hotel reservations to the Mastercard, etc. This could be by the customization of the card which only allow certain types of use of each account, and/or by codes which automatically select the appropriate brand or card account when the user attempts to use the card. This could be in any customization scheme desired. For example, in another embodiment, the first $x amount could be charged to one card account, the next $y dollar amount to another card account, or so forth.

In accordance with a preferred embodiment of present invention, a card could be issued to be always "off", unless the main card or account holder, or the authorized person on the card (i.e. the person given the authority to control the uses of the accounts on the card), authorizes or sets or turns the card and/or a specific use of the card "on" for either a particular time period, or for use until certain conditions are met. For example, the card could be issued to an employee or to a child, and normally be in an "off" state (as opposed to general purpose or regular credit cards which are normally in an "on" state) which can not be used, until the main cardholder authorizes that the card be turned on for the next day (and the next day only). Or, the card could be turned on until one transaction is conducted using the card (or some specified multiple number of transactions are conducted using the card), or a specific use is effected of the card, or turned on in accordance with any of the other customizations of the card described herein. In accordance with this embodiment, the card normally remains "off", but is occasionally or periodically turned "on" for a while to allow the card to be used for a desired purpose. After that purpose has been accomplished, the card goes back "off" again. In this manner, the card can be turned on and off by the user as often as desired or necessary.

In another embodiment of the present invention, the user can maintain a list of available credit card numbers in his or her computer and/or software program, with the list further indicating the specific customized use of each number. Alternatively, the user can maintain a list by hand, or a list can be provided each month with the user's statement. If desired, the uses of each number can vary over time. If an unauthorized user intercepts the first credit card number and attempts to use it for a use that it is not enabled for, the transaction will be declined. For example, a user could maintain 5 separate numbers (or any other desired number), each of which is linked to the main card account. Today, one particular number could be authorized for booking airline tickets for the current business day (but no later), while tomorrow a different number could be authorized for that purpose.

Customization (and activation) of the card or a specific credit card number can be in any of the ways known in the art. In a simple method, for example, the user can call the credit card company and, once his or her identity has been verified, can direct the credit card company to customize the card (or a specific credit card or credit card number on the account) in the manner desired and/or to activate that specific credit card or credit card number. In a variation on this method, the user could be required to call from his or her home phone, with the phone number being verified at the credit card company using "Caller ID".

In another embodiment, the user can use a computer to dial in over a direct connection (or over the world wide web or the Internet on a secure connection) to the credit card company, and program in the desired characteristics using the user's computer. In this embodiment, a software program can be provided to customize and/or activate the card and/or the user can access a web site (i.e. at the credit card company) where a form can be filled out by the main cardholder (or by the authorized person on the card or an authorized card user) to set the desired customization parameters. This form could then be accessed as often as desired to update and/or modify the customization of the card or specific credit card numbers, check the status or usage of the card or specific numbers, etc. In addition, as a further embodiment, authorizations done using this program or connection could be compared (either automatically or upon demand by the user) against actual purchases recorded by the credit card company against the card. In this manner a "cross check" is provided, so that if a limited use, customized or disposable card transaction comes into the credit card company which was not authorized by the cardholder, it will show up on the cross check. In a further embodiment, this cross check could be effected automatically (e.g. each time the user logs, in), periodically (e.g. once per day or per some set time period), upon the user's activation of this feature, or upon the user's deliberate initiation of a cross check.

In some embodiments, the main cardholder orders or obtains the card from the credit card company. In other embodiments, the main cardholder issues or activates the credit cards off of his or her main account him or herself, after transmitting the necessary customization information to the card company, and obtaining the necessary authorization.

If desired, a customized credit card could be converted to a regular, general purpose credit card, or vice versa, if desired. This can be used to deal with changing circumstances, needs or desires of the main cardholder, the card user, the corporation, etc. By a "regular" or "general purpose" credit card, the present inventor refers to those credit cards currently used in the art, which have no limitations on their use other that the card be valid (e.g. be before the expiration date and be of an account in good standing), that the person using the card be the authorized user, and that the transaction be within the available credit left on the card. Subject to those provisions, such cards can be used at any time for any types of purchases at any vendor accepting that type of card.

Should a card or any of the plurality of cards be stolen, a user can with one call deactivate one or all of the cards at the same time. Moreover, since these cards are preferably all linked to the user's main credit card account, and are thus individually on file with the credit card company under that account, the user does not need to worry about safekeeping or storing the list of separate cards or numbers.

As a further security feature, a disposable or customized credit card can be provided with a "fingerprinting area". During use of the card, the user can be asked to place a particular finger on a certain portion of the card to form a fingerprint which can later be used to verify whether the card was used by the rightful owner or used illegally by someone without authorization. Preferably, this area is covered by a flap (e.g. a plastic cover) which is lifted or removed before fingerprinting, to prevent stray marks or fingerprints from appearing on the area before it is ready for use.

With respect to those which are for a single use only, the user can sign (and/or fingerprint) the back of the card, and the vendor could submit or return the cards to the credit card company if desired. Alternatively, the vendor could be required to scan the cards into an appropriate system, with a record of the scan going to the credit card company.

Alternatively, in a further invention, instead of using a "fingerprinting area" on a disposable or customized card, such an area can be placed on the vendor's bill or documentation which currently in the art is signed by the purchaser.

In accordance with another embodiment of the invention, the cards could each have their own PIN number, or PIN numbers.

Upon use of the card, the information regarding the transaction is transmitted to the credit card company, as is known in the art. In a further embodiment of the invention, the information on each purchase from a vendor is transmitted directly to the user after the transaction is completed so that the user can directly monitor and keep records of his or her usage, without waiting for the credit card statement to come in. This information can be sent to the user in any manner desirable. For example, it can be transmitted over the Internet to the user, to the user's web page, or so forth. Instead of the user, it can be transmitted to a third party, if desired; for example, if the card is being used as an expense card for an employee's expense account at a corporation (as described herein), the information can be transmitted directly to the corporation. This transmission can be done by the credit card company itself. Alternatively, if desired, the system can be set up such that the information is transmitted at the point of sale. This can be done with or without the credit card embodiments described above as a permanent or automatic recordkeeping system.

In the preferred embodiment, these credit cards are can be used, processed, etc. by a credit card company in the same manner as with its regular credit cards, with the exception that the present cards provide the additional features provided herein.

In a further preferred embodiment, such customized cards are programmed using software and/or systems provided by Electronic Data Systems of Plano, Tex., with any desired modifications made thereto. Such modifications, preferably include the ability to access and modify such cards over the web with such access and modificationns preferably conducted using the webbanks described herein.

One of the current problems with a regular card, whether it be a credit card, a debit card, or so forth, is that a thief potentially has full access to all of the credit or funds in your account, until the theft or unusual activity is discovered and/or blocked. In the present invention, as described above, a certain set level of funds or type of use of funds can be segregated aside by the user for a desired period, use, or so forth, while maintaining the integrity of the main account intact (and even potentially maintaining the identity or details of the main account secret).

VI. Webbank Interactions with Programmable Financial Cards

A. Programmable Cards Linked to Webbanks

In the preferred embodiment of the invention, the customizable or programmable credit card and debit cards are further designed to take advantage of the power provided by the webbank and the Metabank™. As discussed, these cards are financial cards which have been segmented into a series of functions or parameters for all of the financial card's traditional functions. In the preferred embodiment, each of these parameters can be directly viewed and programmed over the web by the bank owner (and any designated third party) using the webbank which serves as a financial control panel. As a result, consumers are provided with a new level of control over exactly what a credit is and what it can achieve, including how credit cards will be used in the future and who uses them.

In a further embodiment of the invention, any webbank can be linked with a financial card for issuing, monitoring or regulating the financial card from that webbank. In the preferred embodiment, webbanks are linked with customized cards as discussed herein, such that the webbank owner can "issue" and modify credit and debit cards as credit and currency financial vehicles.

The advantages of the system are considerable. For example, the programmable credit card' makes it possible for a corporation to issue credit cards to each and every one of its employees for centralized expense tracking, regardless of that employee's level in the corporation (from the most junior to the most senior). This ability is provided while reducing or eliminating the risk of misuse or loss. Previously, such concerns have minimized the degree to which credit cards could be distributed to corporate employees.

Likewise, the card makes it possible for parents to give a "children's credit card" to a child of any age, also without the risk of misuse, theft, or fraud. Such cards permit children to take part in credit card transactions, whereas they were previously a population barred from participating in such activities.

The card also provides any individual with the ability to extend "credit" to other parties, including parties which would ordinarily not be able to qualify for credit.

Furthermore, the technology allows the first freely transferrable credit card, i.e. a credit card which can be given out and distributed like cash. This allows credit cards to be given out as gifts, serving as a "gift credit card". Consumers are thereby given the opportunity to hand out an open-ended gift that provides the recipient with the complete flexibility to buy what they want. The consumer giving the gift does not pay for that gift immediately (as opposed to the disadvantage of a check or a gift certificate) but rather pays for that open-ended gift over time, as with any other credit card transaction. The recipient, on the other hand receives the gift immediately (or whenever he or she chooses to use it). This is a significant advantage over a physical gift (even a physical gift paid for with a credit card), since that physical gift might not be what the recipient needs or wants. It is also an advantage over even a gift certificate, since that gift certificate must be paid for up front, before the recipient uses it.

The programmable credit card also allows credit cards to be physically handed out for any desired payment purpose. In addition, it provides consumers with the ability to apply for and receive their credit cards instantaneously (within the hour or less), rather than waiting several weeks or longer to receive a credit card in the mail as is currently the standard practice.

Likewise, personal and corporate Currency Cards™ (also known as Programmable Debit Cards™) can be provided as financial tools which, like traditional debit cards, draw on preexisting funds rather than a line of credit. However, unlike traditional debit cards, the Currency Cards™ are provided with a wide range of programmable functions, providing consumers with significant degrees of flexibility and control, as with the programmable credit card described above. Also like the programmable credit card, these functions are programmed using the consumer's webbank.

As a result, the programmable debit card serves as a spending tool of unusual power, with the potential to serve as a simple cash substitute and/or as a substitute for conventional checks. But, unlike cash and checks, the programmable debit card can be instantly tracked and modified using any computer. Accordingly, the programmable debit card allows a consumer to create a simple cash card for a single day or transaction or for any other period of time or customized purpose desired. This customized card can only be used by the webbank owner or an authorized party (and, if desired, only for specific customized uses), thereby minimizing the risk of loss of funds if the card is misplaced or stolen. Using the bank owner's Webbank™, the bank owner's "funds" can be instantly tracked, recovered, modified, or cancelled at any time. The technology, therefore, allows debit cards to be freely customized in any desired fashion and then handed out to any third party, providing consumers with the ability to issue their own "currency".

B. Programming of Customized Cards

As discussed, the properties of the programmable credit card are all set by the webbank owner (or other designated individual). As a result, freely transferrable credit and debit cards can be created.

In one embodiment, for example, blank credit cards or debit cards are provided or made available to webbank users. For example, a blank financial card can be provided having an account number and magnetic stripe thereon (and including an expiration date, if desired) but no name of an account holder. Such blank cards can be provided in the mail or sold, or freely distributed, or distributed via any desired method. Although the financial card has an account number thereon and appears just like any other credit or debit card, it is blank in that it has no actual user or financial account associated therewith. Preferably these cards also have an area which the user can write on (e.g. to place the user's signature, write the user's name, the amount placed on the card or remaining on the card, and/or other desired information).

A webbank owner than takes this blank card and accesses his or her webbank, the webbank having access to the webbank owner's bank or credit card account, which can include actual funds or a line of financial credit. At the webbank, the webbank owner (or other authorized user) can then associate the account number on the financial card with any webbank, webbank subsidiary, or so forth. The account number can be linked to the user's line of credit (which can be in one or more webbank subsidiaries) to form a programmable credit card, or linked to actual funds to form a programmable debit card or so forth.

In accordance with the invention, this programmable credit or debit card is customized, as previously discussed for customized cards or for webbanks. For example, the user can transfer $100 out of his or her total funds (or out of his or her total credit) from the main webbank (or a webbank subsidiary) to a desired webbank subsidiary which is created for and directly associated with a particular blank financial card. The financial card number is input for association of this particular card with this particular webbank subaccount. Thus, the metabank receives the information regarding this association so that this financial card can be used on traditional debit and credit networks. When the user attempts to use this card (e.g.

in a store, at an ATM, or so forth), information is transferred over traditional banking networks to the metabank, which can then authorize the transaction. As a result, a credit or currency card can be quickly created by any user in his or her home or office which can then be used in traditional stores, ATMs (and any other establishment accepting credit or debit cards). Moreover, unlike "smart cards" this card can be created and used without any need for the vendor or consumer to purchase or install any new hardware. Moreover, any desired parameters of the programmable cards (where it can be used, what it can be used for or forth) can be configured by over the web using a webbank.

C. Examples—Gift Credit Cards and Expense Cards

One example of such a programmable card is the "gift credit card" which further demonstrates the power of the current system. In accordance with the invention, the webbank can be used to create freely transferrable credit and debit cards, including cards which can be distributed to any desired party, whether a family member, an employee, a friend or so forth. Thus, a webbank owner can create a currency card or credit card, associate funds therewith, and give that card to any desired individual or other entity for that entity's use.

For example, a gift credit card can be created. As discussed, the webbanks allow an individual's bank account (which as used in the present invention can include a traditional bank account, a credit card account, or any other financial account) to be sliced into as many subdivisions or subaccounts as needed, each of these subaccounts being customized and linked to the main account in whatever manner is desired. Thus, a webbank can be used to associate a blank credit card with a subset of the user's credit line. A webbank owner (or other authorized webbank user) having a $10,000 credit line, for example, could then give away $50 dollars of that credit line to any desired person as a gift. Fifty dollars of the webbank owner's credit line is associated with a webbank subsidiary and that subsidiary (i.e. subaccount) is then associated with a blank financial card. That card could then be given to any desired party as a gift for the party to use whenever the recipient wants.

By providing a webbank network and furthermore, by providing programmable parameters for all of a credit and debit card's traditional functions, the programmable cards make it possible for a corporation to issue credit or debit cards to each and every one of its employees for centralized expense tracking, regardless of that employee's level in the corporation (from the most junior to the most senior) with no risk of misuse of loss. Lost cards can be cancelled using a webbank to deactivate the card or block use of the funds in the webbank. Similarly, the parameters of the funds on the cards can be precisely programmed to minimize or eliminate risk of misuse.

Likewise, the programmable cards also make it possible for parents to give a credit card or debit card to children of any age whatsoever, also without the risk of misuse, theft of fraud.

Moreover, the technology allows freely transferable credit and debit cards to be given out like cash. Unlike cash, however, any funds on such cards, however, can be retrieved if the card is lost, can be blocked if the card is stolen, and can otherwise be tracked, modified, and programmed as desired.

D. ATM Wire Transfers

In one embodiment, a webbank owner or user can quickly and easily wire money to any ATM machine, providing a third party (or even him or herself) with the ability to pick up cash therefrom. This embodiment provides a method which allows cah to be sent to individuals throughout the country or the globe, which the recipient can receive merely by locating a nearby ATM (on the appropriate network, whether Cirrus or NYCE, or so forth). The embodiment is particularly useful to send someone money quickly when one's friend or relative or so forth loses their wallet or purse or has the same stolen.

In accordance with one embodiment of the invention, a sending party is provided and a receiving party. The sending party is anyone who wishes to wire transfer money for pickup at any ATM machine. The receiving party is anyone who wishes to receive money at any ATM machine. The sending and receiving parties can be the same or different individuals.

In one embodiment of the invention, the wire transfer is conducted as follows. A first individual (the desired recipient) picks up a blank financial card. Such a card, as described above, is a card with an account number and magnetic stripe on it and which appears similar to a standard credit, debit or ATM card. The card does not have an account holder's name on it, but can have other distinguishing word or information on it other than the account number to distinguish one card from another. Such blank cards can be mailed to the user, or bought by the users singly or in packs like floppy disks, e.g. at retail stores, newstands, kiosks, or so forth. Alternatively, batches of these blank cards can be provided next to ATM machines. These cards could either be provided for free, or sold, and/or a sum could be deducted for the card at the time of the transaction. For example, the sale of the card could take place using the same card which is being sold so that, once funds are transferred onto that card, the amount of the sale is deducted from the card. Likewise these cards can be provided free (or at a cost) to vendors for them to provide to customers, with payment made to the vendor by the card provider and/or the by the purchaser, either before the time that they are provided to the purchaser, at the time they are provided, or after they are provided (e.g. at the time they are used). For example, in one embodiment, they are provided free to vendors and the vendor is paid once the card is used.

An alternative to using a blank card, the recipient can use an existing ATM card or a programmable debit card or programmable credit card which the recipient already has or carries in his or her wallet. This embodiment is useful when someone wishes to conduct an ATM wire transfer of money to someone who already has their cards with them. In an alternative embodiment, the recipient can use another standard debit or credit card or financial card, although the speed of transfer may thereby be delayed.

Once the recipient picks up or chooses a card, the recipient then contacts a second individual (the sender) and asks the sender to wire transfer funds to an ATM. Alternatively, the recipient can him or herself initiate the ATM wire transfer (and become the sender of funds to the ATM) by using a computer having Internet access.

To initiate this wire transfer, the sender accesses a bank account using a computer. Preferably, this account is a webbank located on the Internet, and can be a webbank created for the present purpose. The sender then takes some or all of the funds in that webbank and then associates, links or transfers those funds with the account number listed on the blank ATM card or the programmable credit or debit card. At the same time, if desired, the sender choose a PIN number on the webbank for association with the card as well. Alternatively, the card can come with a PIN number in its package.

Since the webbank is part of an overseer bank which is linked with traditional banking networks, that overseer bank, the metabank, is able to interact with those traditional networks, and likewise the webbank is able to interact with those traditional networks through the metabank. Once the association of the funds with the financial card's account number is made at the webbank, the information regarding that association is transferred to the metabank which then recognizes that financial card as being a valid debit, credit or ATM card, which is one of its member cards and which has a given amount of funds associated therewith.

The recipient then takes that blank card (or his or her existing card, the existing card preferably a card issued by the metabank) and uses it in the standard well known manner. As the card is a standard ATM card, debit card, or credit card from a standard bank (the metabank), the card can be recognized over traditional ATM networks that the metabank is a member of. Accordingly, no modification to the hardware or software of standard, existing ATMs is needed in accordance with the invention. Once the ATM has read the card, verified the PIN number and received the withdrawal request from the user, the ATM machine then sends an inquiry over traditional networks as is well known in the art. The metabank (or a clearinghouse etc.) can then respond with an authorization to allow the funds to be withdrawn from the card. The ATM machine can then dispense cash and process the transaction in the standard manner known in the art.

E. Wire Transfer to Programmable Debit and Credit Cards

In the same manner, funds can likewise be wire transferred to a programmable debit or credit card for immediate use of that card at merchants (or even to a standard credit or debit card), without needing to withdraw money off of the card at an ATM. As the programmable debit or credit card preferably has a standard magnetic strip thereon (as with standard debit and credit cards), the card can be read at any merchant having a standard credit/debit card reader. In this manner, money can quickly be transferred to anyone's card using a personal computer. Moreover, the transfer can be conducted with out the need to use new technology such as new card readers or smart cards, although those cards can also be used in accordance with the inventions herein.

Thus, in accordance with the invention, the owner of a webbank can further issue cards or any other financial vehicles corresponding to the webbanks, including for example, webbank subsidiaries (subaccounts) or joint accounts created. As described above, for example, disposable cards can be generated. The disposable card can be provided in blank either to the cardholder or to any party and any amount of funds can be placed on it. Or the card can be reusable, such that every day or periodically the desired amount of funds can be transferred onto it. If not used by the end of the day, or by the end of the set period, the funds can revert back to the original account, if desired. Or if the card is lost, the funds are simply transferred back. The same disposable card can be used as an expense card, as a debit card, as a credit card, or so forth.

VII. Webbank Billing, Invoicing and Receipt Center and Electronic Safety Deposit Boxes In accordance with the invention, a method and apparatus is further provided for improving account transactions. Such transactions include any transaction which a user can conduct with a vendor. They include, for example, the notifications of account activity or charges provided to consumers on monthly credit or card statements, debit card statements, bank statements (including mortgage statements), car payment statements, utility statements (e.g. gas, electric, telephone, etc), and any other statements provided to a consumer. They likewise include any transaction at a brick and mortar store, or any transaction between any two entities, particularly on the Internet. Thus, any financial transactions which an entity can engage in can be monitored, recorded (including authentication and date-stamping if desired), and/or facilitated (e.g. via concurrent or post-transaction or pre-transaction payment over the Internet) with the methods and apparatus of the present invention. These transactions can refer to any accounts payable or accounts receivable of a user, or accounts paid or received by any entity.

In accordance with the invention, a customer or user is provided with a centralized website for gathering and maintaining records of that user's financial transactions. If desired, any provider of goods and services can maintain such a website, as well. In the preferred embodiments, the websites utilized and referred to herein are the customers' or users' webbanks.

In one embodiment, vendors, i.e. any providers of goods and/or services (including, but not limited to, banks, utility companies, and so forth) are provided with the address of that website. Those vendors can periodically, or as desired, send statements or information to the website regarding the customer's accounts at the vendor.

In an alternate or additional embodiment, the customer's website has the webaddresses of those vendors preprogrammed in, and accesses those vendors' websites, either periodically or when desired, to gather information regarding the customer's accounts.

In an additional or alternative embodiment, whenever a customer uses a card (whether a financial card or other card) and/or accesses or transacts business using the customer's account at the vendor, information regarding that transaction or use is forwarded to the customer's website. The address of the website can be provided to each individual vendor and/or located on the card itself.

In the preferred embodiment, the cards used are programmable credit or debit cards, although traditional cards can be used as well. For example, a credit card customer can provide his or her credit card company with his or her webaddress. The credit card company maintains a record of this webaddress on file in its records. Whenever the customer's credit card is used, whether at a retail establishment, over the telephone, or otherwise (e.g. in automatic monthly billing or otherwise), the credit card company sends records to the webaddress. The notification indicates and summarizes the nature of the transaction that was processed on the customer's account. Any desired information can be provided, including, for example, the vendor, the place of purchase, the amount of the purchase, the item purchased, and/or any other desired details. In this manner, the customer receives early and frequent statements which serve as both billing statements and as confirmations and receipts whenever his or her credit card is used. These statements can be referred to periodically by the customer when he or she accesses the website to pay his or her bills.

Thus, whenever desired, the customer can then look at his or her website to determine recent activity, pay bills (by viewing statements from vendors which have been forwarded to that webaddress) and so forth. Likewise, the server having the website thereon (or another computer), can be programmed to send the user a periodic email (e.g., daily, weekly, monthly, or so forth) or to post a periodic notification on the website, summarizing the activity of the user for that period. In this way, the customer can monitor his or her financial activity. In addition, he or she can easily spot fraudulent non-authorized transactions.

As a result of the invention, a variety of objects are accomplished. For example, the customer becomes rapidly informed of all transactions that are conducted using his or her cards and accounts, in an almost immediate fashion. If a fraudulent transaction is conducted on the customer's account, the customer will learn of it almost immediately (e.g. at the end of the day), rather than at the end of the month when the bill comes in. As the customer can detect fraud more quickly, and the provider of the goods or services can likewise act on fraud more quickly, as well. This facilitates the reduction of fraud, and the apprehension of the perpetrators of such fraud.

Moreover, the customer is provided with a virtually real-time and/or instantaneously accessible, running record of any and all of his or her transactions, including any transactions conducted with any of his or her financial cards or other accounts. This record is updated whenever the accounts are used, rather than once every month, or is updated periodically, if desired. The record can replace standard bills and statements, or can supplement them.

In an additional embodiment of the invention, the website can process the information received from various accounts in a unique fashion. In the preferred embodiment, upon receipt of the information from a provider, the information in the email is downloaded into a database linked with the website. In the preferred embodiment, the database is maintained on the server hosting the website and/or a database on the customer's own computer. Preferably, the database is compatible with standard protocols and formats and/or with commercial database and/or financial programs, such as Microsoft Access, Quicken, or so forth. In a further embodiment, the website is programmed using XML or another suitable method. The information in this personal database maintained for that customer can then be consolidated and manipulated by the customer in whatever manner the customer desires. For example, the database can be viewed and reviewed by the customer in a variety of ways, just as information in any other database can be viewed, queried, and so forth, as is known in the art. As an alternative to downloading the information into a computer file which is part of a database program, the information could be downloaded into a spreadsheet or any desired financial management program.

For example, in a preferred embodiment, the website can automatically list all of the user's transactions for the day, the month, the year, or so forth. Alternatively, the site can list all of the transactions for a period, all of the transactions for a particular card or account, or any other subset of the customer's total financial information. This processing can be as an alternative to viewing periodic (e.g. daily) updates or in addition to it.

It is preferred that both periodic notifications of activity and automatic statements or consolidations of information provided. Viewing notifications of transactions as they occur (e.g. realtime notification) has the advantage that the customer is immediately presented with information regarding the most recent transactions on the account, each time he or she checks his website. Likewise, automatic statement processing has the advantage that the customer can obtain a table of a large number of transactions at once, making it easier to locate a specific transaction, review usage over time, and so forth. In addition, in the preferred embodiment, periodic consolidations of information can be posted automatically (or when requested by the user) on the website as previously discussed, e.g. all of the activity for some period, e.g. all acitivity since the customer last checked in and/or all activity for the day, for the week, for the month, or so forth.

If desired, the customer can select some or all of the information in the personal account information database and that information can then be processed as the customer desires, upon the customer's request, for integration into a specialized statement in any format that the customer desires. This specialized statement is useful when the customer wants the statement presented in a specific manner, wants information for a specialized amount of time (e.g. 6 weeks, 45 days, one or more quarters, etc.), or so forth.

Similarly, the customer can choose functions on the software or website to have the statement display in a specific desired format. In the same way that a database, spreadsheet, or financial management program can be used to generate different types of reports and reports in different formats, so too the account information can be displayed in a variety of types of reports and formats.

In the various embodiments of the invention, and particularly in the automatic processing or notification embodiment, the user is provided with a real time version of his or her accounts, including accounts from totally different companies and goods and service providers, which can always be up to date, or virtually up to date, rather than one month behind, and which can be easily and quickly accessed and reviewed.

As an alternative to receiving information to a website, the user and/or his software could check the website or database of the financial company or goods and service providers to obtain current information. As a further alternative, hyperlinks can be provided at the user's website to the user's accounts at other vendors. Receiving information at the user's website from the vendor automatically, however, is far preferred.

The website (and/or email, if desired) can also be provided with a link to quickly report back problems to the vendor or provider. Upon receipt and review of the customer's information, the customer can immediately report problems directly to the provider (with the added advantage that the customer does not have to wait on a telephone on hold). The customer can send an email or can click on a link (e.g. from a series of hyperlinks provided). One link, for example, could be to security to report that the customer did not make the credit card purchase reported, and thereby alert security that a fraudulent transaction has just been detected. In addition to notifying the vendor, the detailed information regarding the specific transaction at issue is immediately transmitted back.

In accordance with the invention, transaction information can be sent by a vendor for all attempted transactions, only for transactions which are approved, or even only for transactions which are declined, if applicable. In the preferred embodiment, the confirmation/summary is sent for all transactions, providing the account holder with a complete record and notification of all transactions, both approved and declined ones, as in the case of credit card transactions.

In addition to allowing monitoring information on his or her own account, the invention also allows the customer to more easily monitor and review the activity of other members of the account or webbank, if desired. Accordingly, the email can therefore list which individual on an account the transaction corresponds to.

In accordance with a further embodiment of the invention, the principles of the invention are employed, as set forth above, but in conjunction with a specialized card which is specifically provided to a consumer to allow for the tracking of receipts, or a specialized card which is linked to the customer's webbank, or so forth. In this embodiment, the card is used by the consumer to send data regarding a variety of different types of transactions to a central registry of the consumer or the vendor (such as the consumer or vendor's website), or so forth.

In accordance with this embodiment of the invention, the consumer provides a credit-card-like card to a vendor when a transaction is conducted. This "transaction card," however, is not used to make payment, but rather has the information on it for allowing data regarding transaction information to be routed (preferably over telecommunications lines) to the correct location (i.e. the webaddress of the user's website) for recordkeeping. The card can be provided when the consumer is paying by a separate credit card, when the consumer is paying by cash, by check, or so forth.

Using this transaction card, the transaction card number is input into the system or the transaction card is swiped through an appropriate card reader. In one embodiment, the transaction card is swiped through a standard credit card reader, and is processed using the preexisting networks for credit card approvals. Data regarding the consumer's transaction is then forwarded to the consumer's email address, to a user's web page (preferably the user's webbank), to a file at the card company, or so forth. This data can be as detailed or in as summary a form, as desired, from merely the vendor and the amount spent, to a breakdown of the individual items and/or associated description (for example, based on the associated bar codes). In this manner, recordkeeping regarding transactions can be maintained, data regarding spending can be correlated and analyzed, and so forth. This data can be maintained and collected using a single transaction card to monitor the transactions using many different types of credit cards, to monitor cash transactions, to monitor check payments and so forth, with all of this disparate information forwarded to and/or collected in a single location. The consumer can further phone information into that location. When desired, the consumer can access her or his information, either using a computer, by obtaining a printout (on demand, monthly, weekly, etc.), by telephone, or so forth. As a further service, analyses of spending, and means of reducing spending and/or consolidating expenses, etc., can be provided by the transaction card company as well. Likewise, all of the features described above with respect to the credit card embodiments of the invention can also be applied with respect to the transaction card embodiments of the invention.

In short, in accordance with the invention, a web site or web page can serve as a collector, recordkeeper, and so forth of a party's financial and other information. In a preferred embodiment, the website or personal webbank acts to collect all of the user's financial information, all of the user's records whether bills or receipts being centrally forwarded to and maintained by and at the website or webbank, for the user's convenience. In further alternative or additional embodiments of the invention, any other desired information (whether news or so forth) can be sent to or collected by the website periodically, or as desired.

When desired, the consumer accesses the website and authorizes the payments therefrom. In one embodiment, these authorizations can be in the same manner that Internet banking (or any other computer-implemented or Internet implemented bill payment) is currently conducted. In the preferred embodiments, the website is a webbank (also referred to as a Milliiibank™.) In such embodiments, payments can also be conducted by webbank to webbank transfers, in which funds are transferred between websites, or so forth, as disclosed in the present inventor's related applications listed above. In alternative embodiments, payments can also authorized by any other means, e.g. by telephone authorization by the user, and sent by any other means, including means well known in the art.

Preferably, in accordance with the invention, authenticated records are likewise transferred instantaneously at the same time as the financial transaction, immediately providing each webbank with an authenticated receipt documenting, verifying, confirming, and recording the transaction for future reference.

All transfers or payments made from the website are preferably made sufficiently secure methods, such as using encryption technology as is known in the art, or as further developed in the future. Assymetric or symmetric encryption can be used for sending information over the Internet, or a combination of both. Such encryption methods, including such methods as DES, Triple DES, RSA, PGP, among others, are known in the art, and are used to ensure high levels of security.

In a preferred embodiment, the systems used employ identification (e.g. by using digital certificates), authentication (e.g. by using digital signatures), nonrepudiation, verification and privacy. In one embodiment of the invention, the systems used make use of the processor serial number of the user's computer, for further security purposes.

In further alternative and/or additional embodiments of the invention, information and documents are also sent to the webbank to enable centralized storage of important records for access at any time by the user. Examples of the types of information which can be sent to the personal financial website include: receipts for purchases or payments, credit card statements, bills, tax return documents, real estate deeds, and any other desired information. This information is sent to the website (e.g. in the same manner that email is currently sent, and/or by sending in documents to a central authority which are scanned, and/or by providing electronic filings, authentications and certificates of such transactions, etc.) and is stored on the webbank, or in an appropriate linked area (e.g. on the overseer bank's server or on the server of an appropriate authority, whether private or governmental). Accordingly, when the user wants to access his or her credit card receipts, tax records, real estate deeds, marriage license, or so forth, he or she can dial up his or her personal financial website and access the relevant information thereon. In a further embodiment, a call is made by the user to the website, but the website dials back the user at a predetermined Internet address or phone number or other location (or emails the information to the user's preset email address) to reduce or obviate the possibility of breaches of security.

Thus, as described herein, in a preferred embodiment of the invention, a user has a secure website or a webbank, the website or the webbank preferably being set up on a website on a server of an central authority (such as preferably an overseer bank in the case of a webbank). The user of the website or webbank, can access its website or webbank over the Internet, using secure encryption methods being used as are currently well known in the art, and, if desired, using such further encryption and security methods and apparatus as are developed in the future.

In one embodiment, upon reaching the website or webbank, the user logs in with a password and account or subaccount number. (In a multilayered or many member entity, such as a business, multiple subaccounts and passwords can be provided within the webbank). The account/subbaccount and password identify the identity of the user to the website or webbank, and the authorized functions and clearances of the user.

The owner can review activity on his/her account and any joint account he jointly owns, and can directly arrange payments to any party by conventional or specialized means. Conventional means include such means for bill payment using web banking as are currently well known in the art, and as are provided by numerous banks and by bill payment services. Specialized means can include functions available using a webbank, such as wire transfers to or from any other webbank, transfers of money into programmed joint account for a second party to withdraw when ready or under certain conditions, or so forth. In the latter case, the sender can be set up a own password for access to the funds, or can be assigned a password, the password exchange, for example, being sent by email or by a connection between the sender and recipient, or through the overseer bank or so forth.

With payments through the website or using the webbank, desired or required information can be sent with the payments. With the webbank in particular, any and all further information desired can be associated with such money, payments or transfers, as "attached to" the money or payments. Such associated information can include, for example, who is "writing the check", who is "cashing the check" (or who is authorized to cash it at the recipient), who the contact individuals are at the payee and payor (including addresses, email addresses etc.) for further information, or to follow up, or so forth. Likewise, notes or information can be posted in a joint subaccount or forwarded to a linked subaccount. With notes posted in a joint subaccount, these can be immediately viewable by all members of the joint subaccount and/or can be sent by email to other individuals on the joint subaccount, or by email to the linked subaccount.

The website or webbank can be set up for automatic transactions as well, including automatic payments, and so forth. For payments or transfers, a party can control the payment or transfer time (and can particularly control it with precision with a webbank), and have transfers conducted at the time desired. In the webbank embodiment in particular, the user can verify the transfer directly, and look at the records on both sides.

Thus, in accordance with the invention, a web site can serve as a central collector, recordkeeper, and so forth of a party's financial and other information, including information regarding transactions of all forms and bills and receipts relating thereto. Such transactions can include both Internet transactions and traditional transactions (e.g. transactions at traditional "brick and mortar" establishments). This website or webbank can be used to pay bills or conduct funds transfers, as desired. In further alternative or additional embodiments of the invention, other information can be sent to the website periodically, or as desired. In one such embodiment, financial information (e.g. closing prices regarding the stocks in a party's stock portfolio), news or so forth, can be sent to or collected by the website each day or periodically. In another embodiment, news can be sent to the website.

Moreover, in accordance with further additional or alternative embodiments of the invention, any desired information, not just financial information, can be forwarded to and/or stored on the website or webbank, with or without banking or payment functions provided at the website or webbank. The website or webbank can be used to keep copies of documents such as a party's driver's license, passport, insurance card, medical records, and so forth, which can be "produced" to an appropriate party by accessing the website or webbank when necessary. In this manner, the website or webbank includes functions to further include an "electronic safety deposit box".

Furthermore, in additional or alternative embodiments of the invention, the website or webbank can be used as a storage site of data that the entity keeps on its harddrive, i.e. a centralized backup location which the individual's computer can always access to retrieve data of any form forwarded to or stored by the user or webbank owner.

In a further embodiment of the invention, a website is provided which can further be used to generate electronic invoices for forwarding to third parties. In the preferred embodiment, this website can have any of all of the other functions described herein, and is also the party's webbank.

This website can be provided to consumers in any of various forms. In a first embodiment, the user can type billing information directly onto the website, and can send an invoice from the website to any designated party. The information received at the website can be electronically formatted into an electronic invoice in accordance with any of the current or future formatting protocols for electronic bill presentment. Alternatively or additionally, a particular format can be provided which is proprietary to the such invoicing websites and/or to webbanks in general.

In a second embodiment, information from an accounting or billing program is transferred to the website. At the website, the information is converted or translated into an electronically formatted website as discussed above.

In a third embodiment, one or more programs are provided to the user which enable the user to generate electronic invoices. Such invoices can be generated locally on the user's computer. For example, the invoice can be generated on a personal computer, whether on a workstation, a server, a handheld computer, or so forth. Or, the invoice can be generated using a program accesssed by the user over the Internet.

In the preferred embodiment of the invention, these electronic invoices are then forwarded to the website for storage thereon and/or for forwarding to third parties.

In a preferred embodiment of the invention, the website is a user's webbank. Thus, in accordance with the invention, the website not only collects records, but is used to generate invoices and present electronic invoices to other websites or to other webbanks.

In accordance with the invention, software is programmed and hardware is provided, as are both known in the art, to effect the steps provided herein.

Also in accordance with the invention, any of the embodiments of the present application can further be implemented using technology developed in the future or currently under development, as that technology becomes ready for use on the Internet and/or in commercial applications.

VIII. Electronic Financial Tools and Systems

Thus, in accordance with the invention an entire series of novel electronic financial tools and mechanisms as provided above. Numerous other variations are possible. Some further examples of such tools are provided below.

A. Designated Money

As previously described, money can be associated with any existing or blank financial card, whether standard credit and debit cards, or programmable cards. In accordance with the invention, money can also be "left" for an individual on the Internet for the individual to pick up at any time, or for association with any financial card (existing or blank). For example, a person can create a webbank subsidiary/subaccount and leave money therein for a third party. Such funds can be in various forms, such as a check made out to cash, or so forth, but are preferably encoded for the specific recipient (e.g. using assymetric encoding).

The owner of the webbank can then set a password for the webbank subsidiary/subaccount and then preferably provide both the subaccount number (which as with all of the accounts and subaccounts of the invention, is preferably a webaddress) and the password to a third party. The third party can then access the webbank by typing in the webaddress in his or her browser, and using the password can access the funds.

In an alternative embodiment, if the subaccount number were sufficiently long, that subaccount number could be used alone, as its length could potentially provide security similar to a password as well. In either embodiment, once the subaccount has been created, the third party then, access the money therein, and using any computer transfer that money wherever desired, associate that money with a financial card, or so forth.

If desired, this subaccount can also be associated with a credit card and/or debit card and/or bank account, or so forth, at the webbank. For example, funds could be placed on the webbank subsidiary in association with a card which is physically provided to the third party, or so forth.

Thus, money can be left for any individual on the web, if desired, whether that individual has an account with the metabank, or so forth. That money could then be picked up or used by the individual using just a computer with Internet access, or using an ATM machine, or using a financial card (if the webbank's funds have been associated with a financial card, as previously discussed). In fact, the person accessing the funds need not even own a computer, an email account, or Internet access. The person accessing the funds can use them if he or she has access to a computer having Internet access (whether a friend or relative's computer, a computer at work, a public terminal or kiosk, etc.) or even access just to an ATM machine, or even if the person merely wishes to shop somewhere that accepts credit or debit cards. In this manner, cash, checks or credit and debit cards can be instantly "handed" to anyone else regardless of physical distance.

B. Forms of Funds and Money

In various embodiments of the invention, numerous forms of money or other assets can be provided, as well. Each of these forms can be created by programming the parameters of the webbank accordingly, the webbank serving as the "depository" of that money (or other assets) and listing the properties of the funds or other assets associated therewith.

In one embodiment, "simple money" is provided, which is merely a sum of money, as currently used in the art.

In a further embodiment, multiparameter (or parametric) money and assets can also be provided, i.e. money (or other assets) which has parameters directly programmed therein as part of the funds. A first example of complex money, is as provided above, i.e. money including expiration and termination dates and/or activation dates. Money with an activation date can only be used after a certain date, or only after activated by the sender. For example, it can be owned by the recipient (or by the sender or a third party), but the recipient cannot use it until a certain date, or until the recipient has activated it). Furthermore, divisibility rules (how it can be divided up), what the money can be used for, who it can be used by, and so forth, can be provided as well with multiparameter money. Reversibility (the funds being two way, e.g. such that it is either capable of being retrieved by the sender or, alternatively returned to the recipient), can be provided; or, non-reversibility can be provided (the funds being one way, e.g. non-retrievable by the sender or non-returnable by the recipient) as discussed below. Conditionality can also be provided (e.g. funds are forwarded upon the fulfillment of certain conditions, e.g. when certain times or dates or reached, or when a certain series of approvals are obtained from one or more parties, or so forth). Numerous other parameters can be provided as well.

In the preferred embodiment, the parameters of multiparameter money can be readily ascertained by accessing the webbank account number (e.g. the webbank with the particular webaddress provided for those funds or assets). At that webbank subsidiary the authorized user can view the parameters of the assets of funds, e.g. as text, or as an image or as any other file. This access could be any party in a first embodiment, or by any party with the key in a further embodiment. In the first embodiment, the amount and ownership, account numbers and so forth can be encrypted. In the second embodiment, all information regarding that money can be encrypted. Accordingly, some or all of the parameters or multi-part money can be encrypted or public, as needed by the specific transaction which is being undertaken.

In one embodiment of multiparameter money, compound money is provided, money further attached and inextricably associated with other non-money information, such as a text message, an image, graphical data, a password, etc. such that transfer of such data also transfers money with it, or transfer of such money also transfers such data with it. In one example, for every download the user receives a certain amount of money and that money is part of the downloaded material itself.

In a further embodiment of multiparameter money, money which retains its history can be provided. In this form of money, all movements of the money are recorded in it (e.g. as a numerical tag to the end of the money, by using money in the form of an image or file or so forth), either indefinitely or for a certain predefined number of transactions. As one example, all money originating from a given webbank sends its history back to its originating webbank as it moves from one location to another etc.

Multiparameter money can have transfer provisions as well. For example, it can indicate when, where and/or how it will be transferred, or whether it will revert, if not used. This embodiment is particularly useful to prevent lost money such as that which sits in a dormant accounts till forgotten. In some situations, multiparameter may often not be freely alienable, if programmed as such.

In a further embodiment, money can further be transferred from one form to another, by the webbank owner, as desired.

In a further embodiment, programmable and nonprogrammable money can be provided, i.e. money whose variables can be changed by the user, and those which cannot be.

Signalling money can be provided, i.e. money which sends certain signals or triggers certain events or so forth when used. For example, the money can cause an email to be sent to a party, causes a program to be run, or so forth when sent or when received.

Encrypted money can be provided as well; i.e. money which is received, but can not be used until a decrypting key is provided.

Different forms of passive and active money are available with parametric money as well. For example, a user can create self-investing money, money which automatically takes certain actions for the user (e.g. upon receipt automatically investing itself into certain types of accounts or so forth, even before the user does it, to gain the benefit of the time between when the money would be received and when the user would get a chance to invest it).

Investible and noninvestible money can be provided (either always or for a certain period of time), the latter being money which maintains its value, but which can not be invested, to reduce the risk of loss (but also preventing gains).

Multi-key money can also be provided, in other words, money which has one or more counterparts or keys with both parts, keys or confirmations needed for it to work.

Money can also be designated for its available uses or types of use, as indicated in the referenced provisional with respect to customized credit cards. For example, money can be designated as only available for certain types of uses. Or, it can be designated as depositable into any one of multiple accounts, or for any one or multiple purposes (e.g. analogous to a check made out to "for food" without indicating what restaurant or grocery store, etc. it is for; rather, it is for any restaurant, grocery store, or so forth).

Money can also be linked to other forms of value (e.g. stocks, precious metals, etc.), is desired.

In accordance with the transfer embodiment herein, a party can control the transfer time of funds precisely, and have transfers conducted at any time desired. It can also verify the transfer directly, and look at the records on both sides.

If desired, this transfer can be conducted according to set parameters which are set for that particular subaccount and/or for the entire webbank (or the entire customized card), or so forth. In one such embodiment, a parameter can be set such that the transfer of funds between parties is made immediately (as if the transaction were being conducted in cash). In another such embodiment, the transfer of funds is made after a certain amount of time (e.g. thirty days). In another embodiment, transfers of funds can be in fractions of cents or can include fractions of cents, for micropayments.

In further embodiments, the transfer is reversible or irreversible by the buyer and/or the seller. In a reversible transfer embodiment, after the buyer transfers the funds or the seller withdraws the funds, the buyer can nonetheless pull back the funds or some portion thereof. Reversibility, for example, can be provided for some period of time, or under certain conditions. For example, a transaction can be reversible such that a party can pull his or her money back within a certain number of days. Or, a party can be reversible such that it can get its money back upon not accepting the shipment from the sender. In such an embodiment, the verification of nonacceptance, for example, can be provided using an electronic authentication of the nonacceptance by the shipping company to the webbanks of the sender or the sender and buyer. Alternatively, a transaction can be reversible, upon sending the goods back within a certain period of time, or so forth. In an irreversible or nonreversible transfer, the sender of funds or buyer can not automatically pull back funds from the recipient or seller once the funds have been sent.

In further embodiments, a transaction has to be confirmed (whether at the time of, or at some time after the transaction) by one or more parties thereto for the transaction to be effective.

In further embodiments, the transfer of funds between two parties (e.g. buyer and seller, or so forth) is made in multiple stages.

In yet further embodiments, the transfer of funds is made to one party (e.g. the seller or a third party, or so forth) and notification is provided to a separate party (e.g. a third party, or the seller, or so forth).

In yet further embodiments, the transfer of funds is made upon receipt of certain confirmations or authentications. Such confirmations or authentications can be of a third party or one of the parties to the transaction. Examples of third parties include shippers, appraisers, arbitratrators, or other third parties, whether involved or related third parties, or third party neutrals.

In further embodiments, payments can either be made directly from party to party or through an intermediate holding area or escrow area or subaccount, where the funds are temporarily held.

Thus, in accordance with further embodiments of the invention, a webbank owner can set any desired defaults for money which is created, transformed, received, or so forth.

C. "Intercommunicating" Assets and Funds and Signaling

In accordance with the invention, funds and assets are linked to databases, such that information is associated therewith. As a result, use of the funds or assets, or, in the preferred embodiment, use of their webbanks, allows databases of different parties to communicate with each other, to exchange information associated with those funds, assets, or webbanks, and so forth.

In the preferred embodiment, each webbank has database records associated therewith, such that any and all further information desired can be associated with such money, payments or transfers, as "attached to" the money or payments. Such associated information, includes, for example, who is "writing the check", who is "cashing the check", who the contact individuals are at the payee and payor (including addresses, email addresses etc.) for further information, or to follow up. Likewise, notes or information can be posted in webbank, including a joint subaccount and/or forwarded to a webbank, such as a linked subaccount. With notes posted, for example, in a joint subaccount, these can be immediately viewable by all members of the joint subaccount and/or can be sent by email to other individuals on the joint subaccount, or by email to the linked subaccount.

In one embodiment, for example, use of a webaddress for payment allows other databases receiving that webaddress to utilize the public information associated with that database. As an example, merely using a webaddress (e.g. on a Federal Express® package as the payment account number) allows the Federal Express database to not only access the funds but all other associated information in that webbank. Such information can be the name, address, telephone number and so forth of the shipper. It can also, however, be the name, address, telephone number and so forth of the recipient, the shipping instructions, and so forth. The second database accesses the webaddress and can immediately access and obtain the public information stored at that webaddress's associated database. This can be done by using XML, or any other suitable technique for sharing and transferring information among and between databases.

Likewise, use of a webaddress can also allow signalling to take place. As an example, using a webaddress (e.g. on a Federal Express® package as the payment account number) allows the Federal Express database to send a signal that webbank when the package is delivered. Upon delivery, or within some predetermined time thereafter (e.g. to provide time for inspection), the webbank can then release the funds. Thus, a webbank can be programmed in advance to release funds only within a certain period of time after upon receipt of an authenticated signal from a trusted third party or third party database, such as a shipper or other neutral third party, whether an escrow agent, an agreed upon outside lawyer, or so forth. Similarly, in addition to as an alternative to release of funds, other events can be triggered, such as forwarding of an email to an appropriate party (e.g. that the shipment has been received), creation of a webbank (e.g. which will be specifically associated with those goods), modification of the parameters on the webbank, execution of a program at the webbank, release of data to the webbank or records at the webbank, or so forth.

Verify Records on Other Side

In addition, with a webbank subaccount, whether a joint account and/or a linked subaccount, or with a public subaccount, a user or owner of the webbank can also go directly to a seller/buyer (e.g. by accessing the records of the appropriate linked subaccount or the joint account or subacount) and verify the records regarding whether the money was sent and/or received by that party. Thus a party can check whether funds were received by the payee or transferred out (e.g., "cashed" by the payee). Or a party can check whether funds were mailed out by the payor (i.e. by looking for an authorization or indication on the subaccount or the joint subaccount that an authorization transfer has been entered). Those records, though private to most users, can be set up as "public" or open to the other party involved in the transaction. In one such embodiment, access can be set up so that a party can logs in with an account number and password and requests information from the other party's webbank.

D. Issuance of "Digital Currency"

In accordance with the embodiments of the invention described, if desired, the webbank owner (and/or the central authority) can issue currency (e.g. digital money) on the webbank. Such currency can be transferred, as any other payments described herein, can likewise be associated with specific subaccounts, with specific cards (including cards issued by the central authority or the webbank owner), or can be subject to any other desired parameters.

Localized currency can be generated which can only be used with specific sites; for example, only at the site of the issuer, e.g. using assymetric encryption, as described above. Or, currency can be created which is only good for a specific type of goods and/or for a specific amount of time. For example, public keys can be created which are associated not only with individuals, but with types of goods, specific stores, specific times or ranges of time, or which are associated with any other webbank, fund, or asset parameter. Or webbanks can be programmed to be active only for certain times or only for transfer to certain webbanks or types of webbanks or so forth. Thus, numerous types of currencies, assets and so forth can be created in accordance with the invention.

E. Personal Clearinghouses

In accordance with the invention, the personal webbank can serves as the clearinghouse when a transaction is conducted. The personal website can serve as an intermediary between the credit card company or a bank or other financial institution and the vendor, if desired, transmitting information between the credit card company (or so forth) and the vendor, or can be an endpoint, receiving information from the vendor or the credit card company as transaction are being processed, or once transaction have been completed.

This can be used for financial or other purposes. For example, a user can notify his or her webbank first when credit cards, debit cards, drivers' licenses and so forth are lost. Then when those cards are later used, the first database which is checked is the webbank associated with that card. In other embodiments, transactions undertaken by the user can be set such that all information regarding the user's transactions is sent to the user's webbank, as discussed above, so that the user maintains centralized records and receipts with no loss of information.

Furthermore, these personal clearinghouses could be customized by the user, to the extent permitted by the metabank. Likewise, the management of the funds on user's webbank itself could also be customized, if desired, to the extent permitted by the metabank. For example, the user's funds in its "bank account" or webbank could be delegated for investment by the bank (as is traditionally the practice) or for investment by the user or a designated third party (e.g. a mutual fund, a broker, or so forth).

F. Joint and Linked Accounts

As previously discussed, joint and linked accounts can be provided. An example of a joint accuont would be a webbank (e.g. main account) or webbank subsidiary owned by two or more parties. Additionally or alternatively, linked accounts can be provided, i.e. webbanks linked to one or more other webbanks.

For example, in one configuration, a subaccount on the card or the webbank of a first party ("a first party subaccount") can be linked to the card or webbank of a second party ("a second party subaccount"), with the linkage set so that both the first party and second party are each responsible for paying certain expenses or debts, in a hierarchical, first party pays first, second party pays second configuration. Such a configuration is analogous in some respects to the cosigner concept of the prior art, although with considerably greater flexibility and more extensive uses. In such a configuration, if the first party does not pay a given amount (by a given time, or under certain conditions) then the second party is responsible to pay the amount at issue, and is notified of the fact, and/or the necessary funds are debited from the second party's account, or some buffer account established by the first and/or second party. For example, a linked account can be given to a college student, with the college student responsible for making payments. However, if the college student does not make or misses a given payment, then payments can be made, and are due from, the parent. The payment from the parent can be due at the same time as the payment from the student, or can be due within a certain amount of time thereafter if the student does not make the payment in question. Moreover, both payors, if desired, can see and keep records of the other payor's transactions. Numerous other variations on such a system are possible. Such a system can likewise be used with any account on which there is or would be a cosigner in the prior art.

In another variation on these embodiments of the inventions, businesses or organizations can link or network their webbank or card accounts and/or subaccounts.

In one version of this embodiment, for example, a payor and payee can link their subaccounts such that they can transfer payments and funds between each other, e.g. for direct electronic commerce. In one such embodiment, a buyer and a seller can link subaccounts to conduct a business transaction. In this embodiment, both the buyer and the seller each have webbanks (and/or customized cards) which are used to conduct such transactions.

For example, in one embodiment, the buyer creates an account or subaccount within the buyer's webbank linked to an account or subaccount on the seller's webbank. The buyer can then authorize a certain amount of funds for availability within the buyer's subaccount for or transfer to the seller's webbank, and/or withdrawal by the seller, and/or subject to certain payment parameters, as described herein. Any purchase made by the buyer from the seller is made with the particular subaccount linked to the seller's webbank. Accordingly, when a purchase is made by the buyer from the seller, the buyer uses that particular designated subaccount and the funds from that particular subaccount are automatically moved directly to the seller, either by the buyer effecting a transfer to the seller's webbank or by the seller making a withdrawal from the buyer's webbank.

In further embodiments, groups of two or more individuals and/or businesses or other entities can network accounts to share or allocate expenses. This can be effected using appropriately linked subaccounts and/or using a joint account common to all or some subset of the entities. For example, if three businesses are in a joint venture, their subaccounts can be linked and parameters can be set such that payments can be made from either subaccount (or from a joint account), either in general for all transactions, or for particular transactions or types of transactions. When done in general for all transactions, for example, when any of the parties makes a purchase the amounts due can be withdrawn from any subaccount of the party or from a joint subbaccount, potentially subject to certain conditions. When done for particular transactions, for example, when any of the parties makes a purchase, certain types of purchases are posted to the bill of the first business or party, other types of purchases are posted to the bill of the second business or party, and yet others to the third business or party. Or, alternatively, all purchases made under any of the three subaccounts are divided in thirds (or otherwise divided in some set manner) such that each business or party is billed for its share. Preferably the party also receives notification of the total amount of the billing, and confirmation that the other party was billed for its share, when being billed for its respective portion.

In the preferred embodiments, transfers involving a party's webbank whether to or from that webbank or between two parties webbanks, always has information sent back to that party's webbank and preferably to the overseer bank as well.

If desired, any transfer or transaction can be made with any level of identifying detail and associated conditions as desired. Transactions can be made which list the relevant party or parties, or anonymous transactions can be conducted. Likewise transactions can be conducted under set conditions, as discussed herein.

G. Direct Control of Funds and their Clearance

Accordingly, using the present invention, if desired, parties can transfer money directly among themselves using the financial vehicles provided by the metabank. These transfers are preferably conducted directly, by the parties transferring directly from one webbank to another. In this preferred embodiment, the individuals have the power and authority to execute the transfers directly with the information passing through the metabank (and the funds, in a preferred embodiment, being transferred between subaccounts of the metabank), but with the webbank owner(s) directly executing the transaction and controlling its funds. The parties can therefore move money at any time desired, and are further empowered to move money such instantaneously to another account. This is in direct contrast to the prior art where checks take various days, at a minimum, to clear, where credit card transactions can take days or weeks to be settled, and where even electronic banking by computer, or wire transfers can take hours before the transaction is conducted and/or completed by the bank. Moreover, the user or webbank owner, in accordance with the invention, sets up the transfer itself, directly, rather than providing information to a third party which conducts the transfer.

Currently, an entity's bank is given instructions to execute a transfer; in accordance with the invention, the entities themselves can directly effect transfers of their own money if desired. Moreover, currently, a party can authorize a bank to send funds, but has no control over when those funds are sent or when they clear. In accordance with the invention, the consumer can control precisely when funds are sent, and precisely when or how long it takes for the funds to clear.

Thus, a consumer can write a check (using checks provided by the metabank) and program the webbank so that the particular check clears in one day, or a week, or any other time, as desired. Or a consumer can send funds (e.g. from webbank to webbank) which will be received by the recipient in a day (or any other desired amount of time), but will clear in twelve days (or any other desired amount of time). The other party then can receive the funds quickly (or in whatever the designated time is), but will be unable to use them until the clearance period has elapsed.

Likewise different combinations of the above techniques can be used. For example, in the last illustration, the funds could be certified funds (like a certified check) such that the funds are set aside from the sender's account, which provides verification for the recipient that the funds are available and will be provided at the end of the time period or upon fulfillment of the necessary conditions. At the same time, the sender's instructions to clear the funds after a certain amount of time, can allow the sender time to receive and inspect goods, and/or to collect interest on the funds during the clearance period, or to cancel the deal, or so forth.

H. Metabank as a Certificate Authority

In the preferred embodiment, the metabank serves as a certificate authority. If desired, it can create other lower level certificate authoriteis beneath it, as webbanks, or other metabanks in a network of metabanks, or so forth.

Also in accordance with the invention, authenticated records are provided with all financial transaction, immediately providing each webbank with an authenticated receipt documenting, verifying, confirming, and recording the transaction for future reference (including time and date stamping by the metabank). In addition, all transfers of information between parties are preferably made using encryption technology as is known in the art, or as further developed in the future. Assymetric (public key cryptography) or symmetric encryption (secret key cryptography) can be used, or, preferably, a combination of both. Such encryption methods, including such methods as DES, Triple DES, RSA, PGP, among others, are known in the art, and are used to ensure high levels of security, in conjunction with the systems described herein.

In a preferred embodiment, the systems used employ identification (e.g. by using digital certificates), authentication (e.g. by using digital signatures), nonrepudiation, verification and privacy. The systems used preferably make use of the processor serial number of the user's computer, for further security purposes, and/or of biometric identification means.

I. Bill Filtration

In accordance with another novel invention and feature of the present system, bill filtration is provided. In accordance with this invention, the webbank is provided with the permissible parameters of bills which it is designated to receive. (Although the webbank is preferred, any other computer processor or computer server can also be utilized). Upon receipt of a bill, the webbank checks the parameters of the received bill against the permissible parameters. This checking can be conducted by a computer at the metabank, and/or the user's personal computer or so forth. In this way, if the bill violates acceptable parameters, the user can be notified. Thus, the user is provided with notification of errors in bills or fraudulent charges which he or she might otherwise not recognize.

In a simple example, a user could have an Internet service which is supposed to charge a flat rate of $19.95 per month (a common current rate). Each month when the bill for Internet service is received by the webbank (or when a credit card bill containing that charge is received) the webbank can check to determine whether the charge is indeed $19.95 per month. If the charge is in excess (or less) than that amount, the webbank can notify the user that an error is present.

In one embodiment, for example, each service provider can be provided with its own unique code so that the webbank compares the charges for a specific service provider (a specific code) against the charges received. Such codes and families of codes and likewise, for example, be used to distinguish classes of uses of financial cards (such that some cards can be used at some types of establishments but not others, etc.).

In a further example, a user could be sent information from a trusted third party or organization regarding the acceptable surcharges on a user's telephone bills. Most users have no knowledge whatsoever as to what the exact amount and number of permissible surcharges are. Once the third party sends the data, which is downloaded to the user's webbank, that data could be compared against future telephone bills received by that user. Each time a telephone bill is received, the user's webbank can verify whether the proper or improper surcharges are being assessed.

These techniques can be used to detect both unintentional and deliberate overcharges (and undercharges or credits). For example, a user's webbank could be programmed to recognize its telephone bills as coming from a specific service provider. If a third party deliberately moves that user's phone service to a different carrier (without getting the user's informed consent, or by misleading the user), the webbank could detect that the bills are now coming from the wrong service provider.

In accordance with various recent devices in the art, smart homes and smart devices have been provided which communicate with a party's computer. In accordance with those devices, a party's telephones, its electrical devices and so forth can be configured to send information to the party's computer or webbank whenever that telcould be connected to his or her computer such that each time the computer is used, data regarding that use is sent to the computer or webbank. Thus, when a bill comes in the webbank can compare the usage charges against the usage it has actually monitored to detect errors, and other problems.

J. Retail Store "Bank Tellers"

In a further embodiment of the invention, cashiers at participating retail stores can serve as "bank tellers," to provide users with cash or as any other form of funds. In this manner retail stores participating in the network can participate to receive payments from users or to distribute cash or other assets to users.

For example, an individual can put money on a card and then go to a participating retail store and withdraw cash off of that card in the same manner that a card would be withdrawn from an ATM machine. The cashier verifies the funds on the card by accessing the webbank over the Internet, and provides the user with the sum required. The retail store can, of course, receive a fee for this service, or some other discount or service from the metabank.

Alternatively, the individual can place the funds in its webbank subsidiary corresponding to its account at a retail store (e.g. a Virgin Records, or 7-Eleven, or any store), with the money being used or withdrawn at that store from that store's account, e.g. as a credit in the user's account to be used or refunded to the individual. withdraw money at that location, to the extent the store participates.

The same principal can be used at any retail store, or any other location whether a kiosk, a bank, or so forth. Money or other form of value (whether an account number or so forth), is provided to the cashier of the store (or proprietor of the kiosk or so forth), which then electronically credits those funds to the user's account as a deposit; or, the user can withdraw money at the retail store (or the proprietor of the kiosk or so forth), which the retailer then debits from the user's account.

The money put on at that retailer or location (i.e. paid to the retailer) can be owed by the retailer to the overseer bank or card company or can be deducted from what the card company or overseer bank owes the retailer (i.e. for payments due to the retailer for credit card purchases, or so forth). If the money goes from the retailer onto a user's credit card account, the money goes on the card as a credit to the cardholder's account rather than a debit therefrom. In one preferred embodiment, any or all of the embodiments of the invention, can use part of all of the existing credit and debit card network for processing payments.

K. Functions in Internet Browser

In a preferred embodiment of the invention, any or all of the functions or embodiments of the present invention can be built into the user's browser (or any other desired software) and/or can operate automatically in the background when that software is run.

For example, webbanks can be created by clicking on buttons or functions in the browser, temporary card numbers can be issued and generated for web payments through the browser, cards and accounts can be created and linked through the browser, and so forth.

In one embodiment, for example, to transfer money, a user can click and drag money from one account to another. In one preferred embodiment, the user creates an icon for the transfer corresponding to the parameters of the transaction (e.g., type of money, amount of money, etc.) and transfers that money either by typing a command, by initiating a command off of a menu, by dragging an icon, or so forth.

In one embodiment, a transfer spurns two or more account windows in the browser (e.g. the sending webbank and one or more joint accounts; and, if desired, one or more recipients from the joint account). For example, in one preferred embodiment a user can access a webbank over the web (either another parties webbank or his own) and then, initiate a transfer. In one method, once in the webbank the user right clicks with the mouse, and selects a choice entitled "initiate a financial transaction". If the user is in another party's webbank, the browser launches a window which accesses the user's webbank. Or, if the user is in his or her own webbank, the browser launches a window allowing a party to select what webbank he or she wants to link to. Alternatively, upon right clicking, the user can then indicate whether he or she wants to link to his own webbank, a third party webbank, link multiple webbanks, or so forth.

The user can then keep the multiple windows open and arrange for a transfer either by typing, by selecting a menu option, right clicking an appropriate option, by dragging an icon corresponding to a certain amount of funds from one window to another, or so forth.

In an alternative or additional embodiment, when a user wants to initiate a transfer from its webbank to a second webbank (e.g. while the user is at a website having the second webbank, or being linked thereto), the user accesses its webbank (e.g. by opening a separate window in the browser), and in that window initiates and effects the transfer to the second webbank and other website. This can be done, for example, by typing or copying the other website's webbank identification information into an appropriate spot in the user's webbank, which then conducts the transfer. The user's webbank can, if desired, post an appropriate message to the other webbank along with the transfer of information. The transfer to the second webbank can be to a general account or subbaccount of the second webbank party or to a special subaccount at the second webbank set up for the user, including special subaccounts set up at the time of the transaction.

In accordance with the invention, the user/banker can transfer money by itself instantaneously, and view the updated records on both sides directly; including some or preferably all of the same records that the vendor will see and that the overseer bank/central authority will see. The user will also receive verification information back from the transferee, which the overseer bank maintains a copy of as well, which verifies that the payment has been made.

A user can open up (and display on his or her own screen) multiple accounts on his or screen all at the same time. He or she can also transfer money among those accounts. In a further embodiment, he or she can provisionally transfer funds among the accounts (i.e. run simulations of different sorts) (to see the effects and weigh different scenarios) before confirming a transaction or series of transactions.

L. Payments to or from any Webpage

In further embodiments of the invention, the features of the system allow payments can be made to or from any existing or future webpage on the Internet.

As provided above, in the preferred embodiment, webaddresses are provided as account numbers at a bank or other financial institution. Accordingly, any party can send money to a webpage by sending the funds to the corresponding webaddress. Thus, when the metabank receives such funds, the webaddress indicates to it that the funds are to be credited to the owner of that webpage. If that owner has an existing webbank, the funds can be credited to that webbank; otherwise, the funds can be held for the owner of the webpage to claim or to associate a webbank with, or so forth. The owner of the webpage can be notified that funds were sent to it at the metabank. Alternatively, webpage owners can request a search at the metabank to determine whether anyone has left money for them at the metabank or sent money to them at the metabank.

Similarly, any entity which has a normal webpage can send funds by sending a request to open a webbank to the metabank (including the appropriate information and verifications, etc.). Upon receipt of that request, the metabank can then create a webbank with an account number corresponding to the webaddress of that webpage (e.g. as a publicly accessible account and/or as a privately accesible account).

Moreover, in accordance with the invention, any webbank owner can designate as one of its parameters that the funds deposited in that webbank be sent only to particular normal webpages or else to particular webbanks; or, can designate that funds sent to particular, designated, normal webpages on the Internet, be deposited in this particular corresponding webbank.

Likewise, since the webbanks are represented on the Internet as webpages, any existing webpage can be linked to any desired webbank, in the same manner that webpages are linked to each other in the art.

Similarly, addressing systems can be provided which make use of the webaddress/account number correspondence. In the examples provided, spaces are used within the address so that the present examples do not become hyperlinks in the event that the present application is posted at some future time on a website, such as the patent database of the U.S Patent and Trademark Office.

In one system, a standard tag is used to start the webpage's normal domain. For example, in one embodiment, if the webbanks of the present application were referred to commercially as "milliiibanks" (which could be used as the standard tag), a third party could access a webbank linked to a given webpage (e.g.www.acme.com) by typing "http://milliiibank.acme.com". In this manner any third party could send funds to the owner of "acme.com" by merely sending funds to this milliiibank address which would link to the party's webbank at the metabank. Likewise, the third party could use this address to access the acme.com webbank. Alternatively "mmm" could be used as a standard tag instead of "www" or so forth.

In a further embodiment, a webbank could be a path off of the metabank's webaddress. For example, if the metabank were referred to as "firstmetabank.com", a party could send funds to the owner of "acme.com" by typing "www.firstmetabank.com/acme.com". In this manner, the metabank recognizes that the use of the domain name "acme.com" indicates that an attempt is being made to access the acme.com webbank, and the user is directed to that webbank.

In a further embodiment, an owner of a webbank can create a webbank linked to an existing webpage or create joint webbanks by using both parties webaddresses (or webbbank addresses) in a single webbank address. Thus, "Jane Doe" can jointly create a webbank with "acme.com" at acme's webbank by creating a webbank at "www.firstmetabank.com/acme.com/janedoe" for tracking her account or purchases at acme (with acme's permission), or could create a webbank "www.firstmetabank.com/janedoe.com/acme.com" as one of the webbank subsidiaries linked to her webbank for tracking all of her purchases at acme, receiving bills from acme, and so forth.

Numerous other addressing systems can likewis be used in accordance with the inventions herein.

M. Financial Cards with On/Off Switches

In a further embodiment of the invention, financial cards can be provided with on/off switches as referred to above. Just as the parameters of the webbank can be set to be "turned on or turned off", including usable or not usuable during certain periods of time, the financial cards can likewise be "turned on" or "turned off" as well.

In one such embodiment, such cards are turned on by the owner before they are about to be used and turned off after they are used, to prevent a third party who has compromised the financial card number from being able to use that card.

For example, for online purchases, in the preferred embodiment, the owner of the card can click on a button on the owner's Internet browser which sends an encrypted signal to the owner's webbank (or to a card authority) providing identification of the owner, and indicating that the card can be turned on. Alternatively, the browser can do this automatically, if desired, e.g. when it accesses the Internet in general, or when it detects that a card is about to be used (e.g. by recognizing the digits about to be sent online.

When the card number is provided to a merchant to attempt a transaction online, the merchant's system requests authorization over existing networks to use that card (as is standard in the art). If the card has been turned on, the card authority (which can be any credit or debit card authority, but is preferably the metabank in the event that webbanks or programmable cards are used) can authorize the transaction having recently received a signal that the card has been turned on. After each use and/or after a predesignated period of time and/or after receipt of a signal from the card owner, the card can then be turned off.

When an unauthorized user attempts to use the card, the card will normally be in the "off" state, and therefore will be declined. For online transactions, the relatively unlikely xception to this is the very short window of time after the signal is sent, when the owner is about to use the card. In the preferred embodiment, however, the user or its browser sends a signal that the card is to be turned "on" before each and every transaction using the card. Thus, if an unauthorized user attempts to use the card number in this window, two requests for verification will be received by the card authority (or metabank) in the short window following a single "on" signal, the requests coming from two different vendors. This will, therefore, be an indication to the card authority that the card may have been compromised.

As an alternative to an "on/off" signals, other signals from the browser (and/or from the webbank) can be provided indicating that the card is about to be used by the rightful owner, although a complete on and off is provided in the preferred embodiment.

In alternate embodiments, cards can likewise be turned on and off using a signal from the browser or from a webbank to a user's webbank or to the metabank, or to some other card issuing authority (or using a telephone call or so forth) before the cards use to turn them on for use at brick and mortar stores as well. However, the preferred embodiment for this system is online usage.

In further alternate embodiment, "one-time" card numbers can be provided for use in only a single transaction. Such numbers can also be used in conjunction with the present invention.

N. Fund Investment

As one example, the webbank owner can have its money invested in any form of investment it wishes. For example, the webbank owner can have the money on its webbank invested in stocks and/or bonds and/or currencies and/or options and so forth. The webbank owner can manipulate these investments as often as he or she wishes. In this manner, an alternative to traditional interest can be provided; with the interest wholly owned by the webbank owner, or with a portion being held by the metabank as a service fee.

In one preferred embodiment, these investments all go though the metabank. Thus, the webbank owner's purchases are debited from the webbank owner's account and the bank purchases the stocks, bonds etc, that the webbank owner wants using the money withdrawn. The particular investment is then held in a subaccount of that webbank owner's webbank, the investment either being owned in name by the overseeing bank, the webbank, or both.

Likewise, webbanks can be used to extend or track loans by a webbank owner, or group of owners.

Additionally, a webbank can be created to uniquely correspond to a particular purpose, including a particular asset (or to one or more purposes or assets). For example, a webbank can be created to correspond to an asset such as a car or a house, or so forth. All payments on that asset can be made on that webbank (and/or received by the creditor at that webbank) and/or all information regarding payments on that asset can be stored on that webbank. Likewise all other information regarding that asset can be stored on that webbank in authenticated form. For example, for houses and cars, bills and receipts regarding repairs, service information, contracts, survey information, blueprints, recall data, contracts, certificates of title, and so forth can all be sent to and stored on that webbank so that all documents corresponding to that asset are held in one centralized location and stored together, preferably in authenticated form.

O. Providers of Goods & Services: Records Continually Transferred to Client Webbanks In a further embodiment of the invention, service (and/or goods) provider records can be transferred on a continual basis to a client webbank so that the client can continually monitor the cost and progress on services and goods. For example, with respect to service providers such as entities that bill by the hour (for services, for goods, or so forth), time records or records of goods, invoices, etc., can post immediately to the web site as the costs are incurred, so that the client can continually monitor the time and goods, expenses, expenses that are being put in, delivered, shipped, and so forth. This client webbank can be a separate one created for this purpose, if desired.

In this manner, the client can monitor information at its own webbank or website directly, rather than being informed of time or charges in a lump sum one to two or more months later, or receiving a bill later in the mail, or having to contact providers or other websites for information, or so forth. This information is sent to and integrated into the client's website (e.g. using XML etc.) such that the webbank owner has instant access to it as part of his or her site without having to access multiple sites for such information.

P. Online Auctions

In further embodiments of the invention, the webbanks can be used as financial vehicles in conjunction with online auctions (such as those conducted by "e-bay") and other online payments systems. Thus, a webbank can be set up as an escrow account, wherein the funds therein are certified by the metabank and can be viewed by both parties to a transaction. The identities of buyers and sellers could be revealed to each other or could be anonymous (e.g. with only the metabank knowing their identities). Funds can be released when shipment is completed and the goods are inspected, as described above, and so forth.

IX. Physical Card Embodiments

A. Plastic or Paper Cards

Numerous card can be provided in accordance with the inventions herein. In one series of embodiments, as discussed above, blank credit or debit card like cards can be provided. Such cards could be of the type as currently used in the art for standard credit and debit cards (i.e. of the same shape and thickness) or alternately, of any shape and thickness which could be used with current or future card readers. In alternate embodiments, smart cards can also be used in conjunction with the present invention.

The owner (and/or the metabank) can issue and provide disposable or customizable credit or debit other cards or card numbers on the webbank (either numbers can be provided or the card issuing authority or metabank maintaining the server mails them out) having either a specific amount of money on them or being linked to a specific account or subaccount, or to a certain percentage or set of parameters of a specific account or subaccount, and distribute those cards to themselves or to third parties. These cards can be linked to accounts, in any manner desired. These cards can have any form of money described herein associated therewith.

In another embodiment, a user could be provided, each month or each year, with a set of disposable, one time only, or customized, limited use, numbers and/or cards, which are printed on the credit card statement for use during the next month or year, or which are mailed to the user. With respect to the disposable card, the user is instructed that, after use of the number once, the number may not be used again. With respect to the customized card, the cards can either be preset for certain uses, or the cards can be ready and waiting in the user's office or home for setting to the desired use when the user is ready.

The user could also be provided with a set of paper or plastic credit cards (preferably with magnetic strips), whether along with the customer's monthly statement, with a credit card encoder, with an encoding device which attaches to the computer and/or the Internet, or otherwise. Each of these credit cards could be used once, or on a limited or customized basis, after which the credit card could be ripped up and discarded. The cards could further have printing or indicia on them to remind the user that they are for one time only or customized use.

In a further variation on this approach, the paper cards and/or the provided numbers must be used in a specific required order, for additional security. These paper credit cards or provided numbers could be unusable until activated by the user, as is the practice with new credit cards that are sent out by mail.

In another embodiment, instead of ripping the credit cards up, the cards could have a portion which the user writes on to record the type of transaction, and the amount of the transaction. Alternatively, the card could have a portion which the user signs upon receipt and a portion which is later countersigned at the vendor, to provide additional security.

These credit cards could even have a portion which the user signs and provides to a vendor in a store. No vendor would ever, under one embodiment of the system, receive or have access to the user's permanent credit card number. Rather, the vendor (for example, a restaurant in which the user has just eaten) would receive a disposable credit card from the user's supply. The vendor could read the number off the disposable or customized card, could scan the number with a bar code scanner, could read a magnetic strip on the disposable card, or so forth. Upon being used once, the credit card can be marked, if desired, to show both that it has been processed to charge money to the person's account, and to show that it is no longer usable. This disposable card could be returned to the cardholder, saved as a receipt by either of the cardholder or the vendor, be returned to the credit card company, destroyed, or so forth. As noted above, signature could be provided once, or two signature lines could be provided, for the user to sign and countersign.

Alternatively, other features (such as a fingerprinting area, or so forth) can be provided as set forth above.

B. Computer-Readable and/or Writable Cards

In a further embodiment of the invention new type of diskettes and cards are provided. In one preferred embodiment, combination optical disk and magnetic stripe cards (e.g. Miracards™) can be utilized in conjunction with the system herein.

Thus, in accordance with the invention, a product is provided which is a combination optical disk, and financial or magnetic stripe card. Examples of such optical disks, include, but are not limited to, compact disks (CDs, CD-ROMs, etc.), Digital Video Disks (DVDs), minidisks, and so forth. For simplicity, the term CD is often used hereafter, but is to be understood that the term is intended to include any optical disk, including, in particular, recordable optical disks, and read/writable optical disks. Examples of magnetic stripe cards include but are not limited to, credit cards, debit cards, ATM cards, identification cards, photocopier cards, transportation cards, and so forth. Likewise, although the term credit card or credit card number is used repeatedly herein for simplicity, any financial card or financial card number can be used, if desired.

Figure 2:
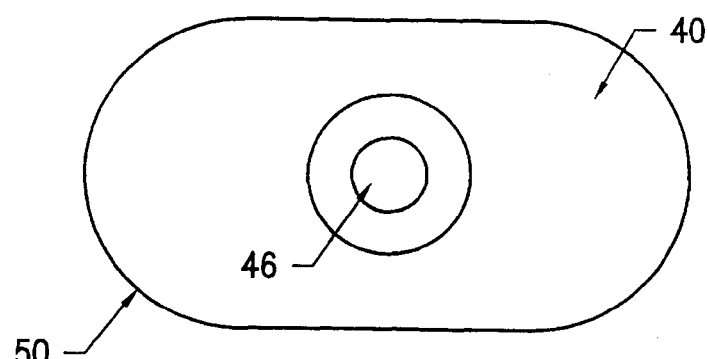
FIG. 2 is a top view of an optical disk for use in conjunction with the systems of the present invention.
Figure 3:
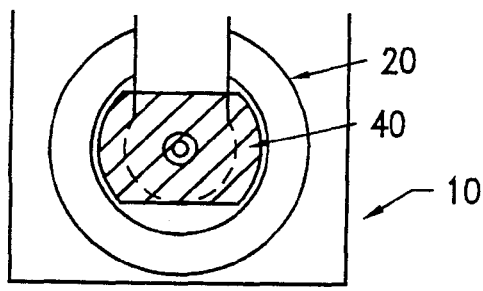
FIG. 3 is a top view of the optical disk of FIG. 2 nested in the disk carrier of FIG. 1.

In one set of additional or alternative embodiments of the invention, the optical disk is shaped like a standard credit or business card, such as the CD-ROMs which have been recently developed in the art. Such business card shaped CD-ROMs and are believed to be the subject of a pending patent application of a separate party. These disks, rather than being circular, have straight edges but have rounded corners, and are of a size and shape such that they can easily fit in a standard optical drive's disk holder, in the smaller inner circle of the disk holder (i.e. the recessed inner circle), and not necessarily filling the full circular shape of a standard optical disk, as shown in FIGS. 1-3.

As shown in FIG. 1, a standard optical disk drive disk holder 10 or carrier of a computer (such as a carrier for a CD-ROM) includes an outer circle 20 (for ordinary sized CDs) and an inner circle 30. In accordance with the invention, as shown in FIG. 2, a business or credit card shaped disk 40 is provided with rounded corners 50. As shown in FIG. 3, the disk 40 with rounded corners is preferably sized and shaped to fit into the inner circle 30.

In accordance with the invention, optical disks and magnetic stripe cards are combined into a single disk or card, for use in a variety of applications.

In one embodiment of the invention, an optical disk is provided, similar to a standard optical disk, but having a financial card number printed therein (e.g on the card's front). This financial card number can be any credit card number, debit card number, bank card number (for use in an ATM machine), webbank number or address, or so forth, allowing the optical disk to have information printed thereon for conducting a financial transaction (or for other uses, if desired).

In a further embodiment of the invention an optical disk is provided having a magnetic stripe provided thereon.

In a further embodiment of the invention an optical disk is provided having both a financial card number and a magnetic stripe provided thereon. In a preferred embodiment, the magnetic stripe is encoded with an account number, such as, for example, a bank card number, credit card number, debit card number, or so forth.

In one such embodiment, the optical disk is a standard CD-ROM, DVD, minidisk, or so forth, having the financial card number printed thereon, and a magnetic stripe provided thereon for swiping the disk through a card reader. In a further embodiment, the magnetic stripe is encoded with an account number, preferably a financial account number. The magnetic stripe, for example, can be provided on the front or top of the disk, i.e. the printed side of the disk opposite the optically encoded surface.

Figure 4A:
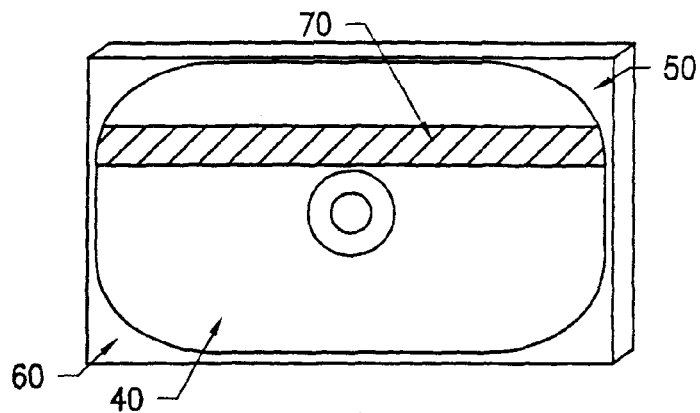
FIG. 4(a) is a perspective view of the optical disk of FIG. 2 inside a protective sleeve, the optical disk further having a magnetic stripe thereon, in accordance with the present invention.

In additional or alternative embodiments, the optical disk 40 has such a business card or credit card like shape as disclosed above, but also has a magnetic stripe 70 on the disk, as shown in FIG. 4(a). Such optical disks in a business or credit card size (but without a magnetic stripe thereon) and shaped to fit in the drive holder of an optical disk drive are currently made or distributed by the Internet Services Corporation of Charlotte, N.C. The optical disk 40 is shown in protective sleeve 60 which (like protective sleeve 80 below) can be made or clear plastic and can be rectangular (as shown) or can have rounded corners like the disk (not shown). In one embodiment of the present invention, such cards are provided including a magnetic stripe thereon, said magnetic stripe being on the front or top of the disk or elsewhere are described herein. In a preferred embodiment, the optical disks of the present invention (both with respect to this and the other embodiments of the invention) are recordable optical disk (which can be written to using recordable optical disk drives available for personal computers) or read/write optical disks (which can be written to using read/write optical disk drives available for personal computers).

Figure 4B:
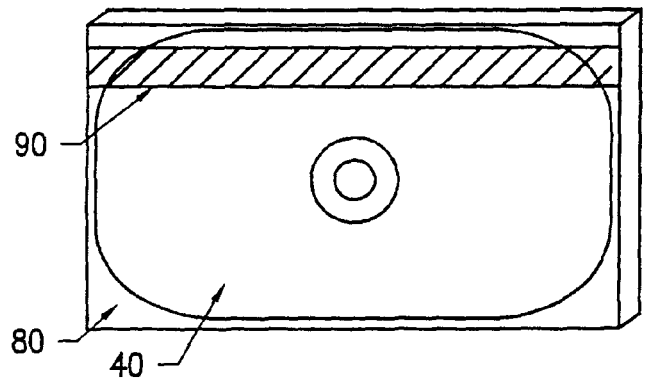
FIG. 4(b) is a perspective view of the optical disk of FIG. 2 inside a protective sleeve, the protective sleeve further having a magnetic stripe thereon, in accordance with the present invention.

In additional or alternative embodiments, the optical disk can be housed in a protective sleeve 80 with the financial card number and/or magnetic stripe placed on the protective sleeve 80 as shown in FIG. 4(b). In this embodiment, preferably, the sleeve has at least a magnetic stripe thereon. Further preferably, the sleeve also has a financial card number (and any other desired information and images) printed thereon, as well. This optical disk is preferably business card shaped as disclosed above. The sleeve can either be a soft, flexible sleeve, a more rigid cardboard type sleeve. The sleeve can even be a jewel case, although this is not necessarily a preferred embodiment due to the thickness of the case, which prevents it from being able to be swiped through a magnetic card reader. In these embodiments relating to the sleeve, the optical disk, with the sleeve thereon can be swiped through a card readers which reads magnetic stripes.

In one embodiment of the invention, an optical disk is provided with a number thereon, such number corresponding, for example to a webbank account, to a credit card number, to a debit card number or to any other financial account number. Such a disk can include an optical disk without a magnetic stripe thereon, wherein the disk is preferably recordable or read/writable with a personal computer. Preferably the optical disk is further business or credit card shaped. In additional or alternative embodiments, the optical disk can further have electronic cash stored thereon and/or a webbank account or webbaddress stored thereon.

In additional or alternative embodiments of the invention, an optical disk is provided with a magnetic stripe thereon. In one such embodiment, the magnetic stripe is on the front of the disk (not on the optical surface).

Figure 5:
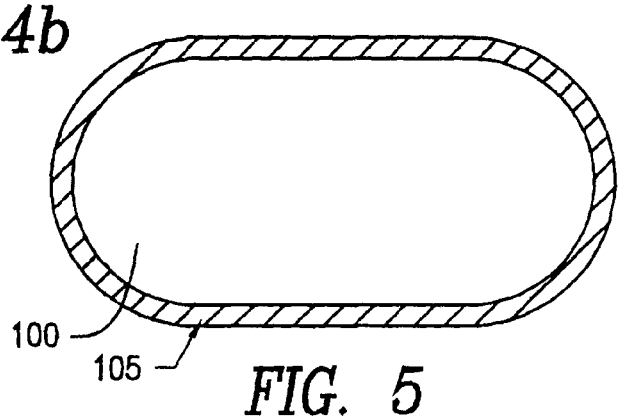
FIG. 5 is a top view of the optical disk of FIG. 2, with one embodiment of a cover thereon in accordance with the present invention. If desired, any of the covers of the present invention can have a magnetic stripe on their outer or inner side.

In additional or alternative embodiments of the invention, an optical disk is provided with a cover 100 which covers the back of the card 40 (i.e. which covers the encoded optical surface), such cover also being removable such that it no longer covers the optical surface when desired. An example of one such cover (with a flexible, elastic lip 105 that fits snugly over the edges of the optical disk) is shown in FIG. 5.

If a cover is provided, in one embodiment, the magnetic stripe is on the opposite side of the card from the optical surface. In another embodiment, the magnetic stripe is on the cover itself. In such embodiments where the magnetic stripe is on the cover, the magnetic stripe can be on the side of the cover facing inward (i.e. adjacent to the optical surface), or can be on the side of the cover facing outward (towards the user). When the magnetic stripe is on the outside of the cover (facing the consumer), the hybrid card can be swiped directly and easily swiped through a magnetic credit card reader without removing the cover from the card. On the other hand, in embodiments in which the magnetic stripe is on the inside of the cover (facing the optical surface), the configuration of the card is such that the magnetic stripe faces inward and not outward, so that the magnetic stripe is protected from wear and tear. In a further embodiment, the removable cover can be flipped so that the magnetic stripe faces inward or outward, as desired. Likewise the optical disk can be flipped so that the optical surface faces outward from the cover, or inward towards the cover.

Figure 6:
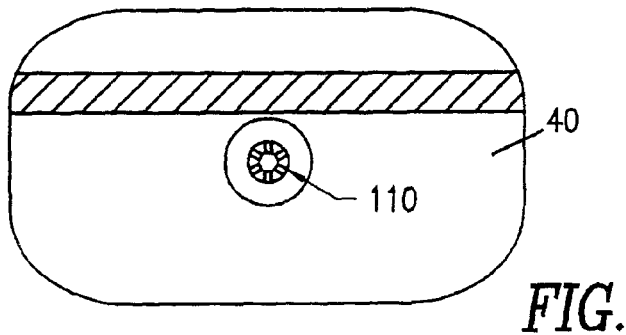
FIG. 6 is a top view of the optical disk of FIG. 2 with a cover thereon, but wherein the cover has a hub which grasps the center hole of the optical disk.

Numerous such covers can be provided. In one type of cover, the disk 40 sits in the cover. For example the edges of the cover can snugly fit over the edges of the disk to cover the optical surface of the disk. In an alternate form of cover, the cover serves as a holder which the disk fits into, the cover covering the back of the disk, the cover also having a circular portion or hub 110 which grasps the center hole 46 of the optical disk, as shown in FIG. 6. (With the cover being in back of the disk 40 shown in FIG. 6, and the hub 110 protruding through disk 40). This circular portion or hub is known in the art, being used, for example, in CD cases known as "jewel cases". In yet a further form of cover mechanism, the optical disk can have a groove or track that the cover slides in and out of. In yet a further form of cover mechanism, the cover can fold back, and preferably be caught by a lip on the optical disk.

In a further embodiment of the invention, the optical disk has a sleeve or case associated therewith, the associated sleeve preferably having a magnetic stripe thereon or therein. In one such embodiment, the sleeve can be flexible and soft (the material being like well known soft CD-holders such as a paper like material, or soft, flexible plastic, or so forth). In an alternate embodiment, the sleeve material can be more rigid, like cardboard or rigid plastic or so forth.

In the preferred embodiments of the invention, the optical disk is shaped in the shape of a credit card, or business card or so forth. In further preferred embodiments of the invention, this optical disk preferably fits into a CD or DVD drive, being placed into the disk holder of the drive and preferably fitting into the smaller inner circular area of that disk holder. In such embodiments, the edges of the optical disk are preferably rounded such that the optical disk can preferably fit into the smaller inner circular area of that disk holder.

If desired, an adapter can be provided to fit the small optical disk into the drive's larger sized disk holder more snugly. Or the cover of the disk can itself be an adapter, adapting the disk to better sit within the disk holder of the optical drive. For example, the disk can be a minidisk attaching to a cover with a magnetic stripe, and the cover can have rounded edges to sit within a smaller inner circle of the disk holder of the optical drive (e.g. a CD or DVD drive). Or, if desired, the minidisk or other optical disk can detach from the business card shape case or cover (which it is normally carried in) and be attached to an adapter (preferably a fully circular adapter) which sits in either the smaller inner circle of the disk holder of the drive or the larger outer circle of the disk holder of the drive.

In alternative or additional embodiments of the inventions, the magnetic stripe can also be provided within the plastic of a case or holder for the optical disk, so that it does not wear off as easily with use. Or, the magnetic stripe can be provided the plastic of the card; e.g. within the plastic of a clear credit card. In one embodiment, the magnetic strip is sandwiched between two layers of flexible or hard plastic, the plastic preferably being partially or totally clear.

In alternate or additional embodiments of the invention, the invention consists of a credit card and optical disk packaged together or otherwise provided together.

Thus, in accordance with the invention, a hybrid magnetic stripe credit card and optical disk card is provided, which can be programmed on a personal computer, and which can also be used at ATM machines (e.g to check account information or withdraw funds), can be swiped through a magnetic stripe readers (e.g. at the time of purchase of an item from a store), and so forth.

In alternative or additional embodiments of the invention, the cards can include multiple account or card numbers encoded thereon, serving as a type of "universal card," with, if desired, the consumer deciding at the time of use which card encoded on the universal card he or she wishes to use for that particular transaction.

Accordingly, in various embodiments of the invention, either the whole device can be inserted into a magnetic stripe reader and/or an optical disk drive, or the device can be opened or pulled apart, and each part of the device can go into a magnetic stripe reader and/or an optical disk drive.

In further embodiments of the invention, the information which can be downloaded onto the card include email, webpages, and so forth.

These cards are particularly useful with the e-commerce inventions of the present application, including the customizable (programmable) cards and accounts, and/or as cards containing or linked to electronic cash and/or as cards linked to webbanks or having information related thereto located on the card, and/or with the website central records systems disclosed therein, and/or as cards having any other type of information thereon.

The present optical cards can also be encoded with software thereon, with music, with videos, with asymmetric encryption tools (e.g. a public key and/or a private key), with financial data (e.g, with account numbers and/or records), with e-cash, with a webpage or webbank info, or with any combination of these.

In a further embodiment of the invention, an optical disk (whether a regular CD, or CD-ROM, or DVD etc.) can be encoded with financial information thereon in addition to the music or videos thereon. For example, a music CD or video DVD can be provided having electronic cash or checks or other money encrypted thereon, and/or information relating to or linking to a webbank, and/or information which when accessed allows the user to obtain money (including, for example, a rebate obtained by accessing an account having funds therein, the account or funds preferably being at a webbank).

Having described the inventions with respect to particular embodiments, it is to be understood that the description is not meant as a limitation, since numerous other modifications and variations on the invention may be made to the inventions or may suggest themselves. It is intended that the present invention and application cover all such modifications and variations. Moreover, to refer to sections of the application various headings have been provided as set forth above. Such headings have been provided for reference purposes, and are not intended as a limitation hereof, as the information in each paragraph relates to and is intended to be used in conjunction with the inventions as disclosed in all other paragraphs herein and in conjunction with the information presented in the related applications.

What is claimed is:

1. A system for transferring funds, comprising,
a plurality of webbanks, said plurality of webbanks comprising a first webbank and a second webbank;
said first webbank comprising a first website hosted on a server for the use of a first webbank owner, said first website having funds of said first webbank owner associated therewith;
wherein said first webbank has a first webaddress associated therewith and is accessible by said first webbank owner over the Internet using said first webaddress;
said second webbank comprising a second website hosted on a server for the use of a second webbank owner;
wherein said second webbank has a second webaddress associated therewith and is accessible over the Internet via input of said second webaddress into a web browser, such that said second webaddress is both the address of a website of said second webbank owner, and is an account number which acts as an addressible destination over the Internet for the transfer of funds thereto; and
wherein said first webbank owner has access to said first webbank to transfer funds between said first webbank owner and said second webbank owner, such that said first webbank owner's provision of said second webaddress at said first webbank causes funds to be transferred between said first webbank and said second webbank;
and wherein at least one of said webbanks is associated with a financial card.

2. A system as claimed in claim 1, wherein said second webbank is associated with a financial card, and wherein said first webbank owner has access to said first webbank to transfer funds between said first webbank owner and said second webbank owner, such that funds from said first webbank are transferred to said second webbank's financial card.

* * * * *